United States Patent
Mickel et al.

(10) Patent No.: US 12,153,136 B1
(45) Date of Patent: Nov. 26, 2024

(54) SYSTEMS AND METHODS OF IMAGING AND/OR RANGE FINDING

(71) Applicant: GENERAL ATOMICS AERONAUTICAL SYSTEMS, INC., San Diego, CA (US)

(72) Inventors: Patrick R. Mickel, San Diego, CA (US); Drew F. DeJarnette, San Diego, CA (US); Matthew C. Cristina, Oceanside, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 923 days.

(21) Appl. No.: 17/206,582

(22) Filed: Mar. 19, 2021

(51) Int. Cl.
| | | |
|---|---|---|
| G01S 17/00 | (2020.01) | |
| G01S 7/48 | (2006.01) | |
| G01S 7/484 | (2006.01) | |
| G01S 7/486 | (2020.01) | |
| G01S 17/42 | (2006.01) | |
| G01S 17/89 | (2020.01) | |

(52) U.S. Cl.
CPC ............ *G01S 17/42* (2013.01); *G01S 7/4804* (2013.01); *G01S 7/484* (2013.01); *G01S 7/486* (2013.01); *G01S 17/89* (2013.01)

(58) Field of Classification Search
CPC ........ G01S 17/42; G01S 7/4804; G01S 7/484; G01S 7/486; G01S 17/89
See application file for complete search history.

(56) References Cited

U.S. PATENT DOCUMENTS

| | | | | |
|---|---|---|---|---|
| 9,952,047 | B2* | 4/2018 | Nordenfelt | H04N 23/56 |
| 2011/0310226 | A1* | 12/2011 | McEldowney | G06F 3/0325 |
| | | | | 348/46 |
| 2018/0329065 | A1* | 11/2018 | Pacala | G01S 7/486 |

OTHER PUBLICATIONS

Wikipedia; "Lidar"; https://en.wikipedia.org/wiki/Lidar; last edited Jun. 21, 2021; pp. 1-37.
Wikipedia; "Readout integrated circuit"; https://en.wikipedia.org/wiki/Readout_integrated_circuit; last edited Jun. 26, 2020; pp. 1-2.

* cited by examiner

*Primary Examiner* — Luke D Ratcliffe
*Assistant Examiner* — Vicente Rodriguez
(74) *Attorney, Agent, or Firm* — Fitch, Even, Tabin & Flannery LLP

(57) ABSTRACT

In some embodiments, systems are provided to determine distances to one or more objects, and comprise an image capture system; an angular movement system; an illumination source providing illumination having a time varying amplitude; and a range measurement circuit configured to: obtain, based on at least one of measured and induced LOS angular displacement changes relative to the image capture system, a set of candidate point-spread-functions (PSFs) corresponding to different possible ranges; deconvolve, using the candidate PSFs, at least a region of interest (ROI) in an evaluation image to obtain at least a set of deconvolved ROIs of the evaluation image, each corresponding to one of the candidate PSFs; identify a first candidate PSF that produces a deconvolved ROI resulting in a determined artifact power that is lower than a corresponding artifact power determined from the other candidate PSFs; and determine a distance corresponding to the first candidate PSF.

21 Claims, 11 Drawing Sheets

Reference Image

Evaluation Image

Wrong PSF (Deconvolve)

Artifacts

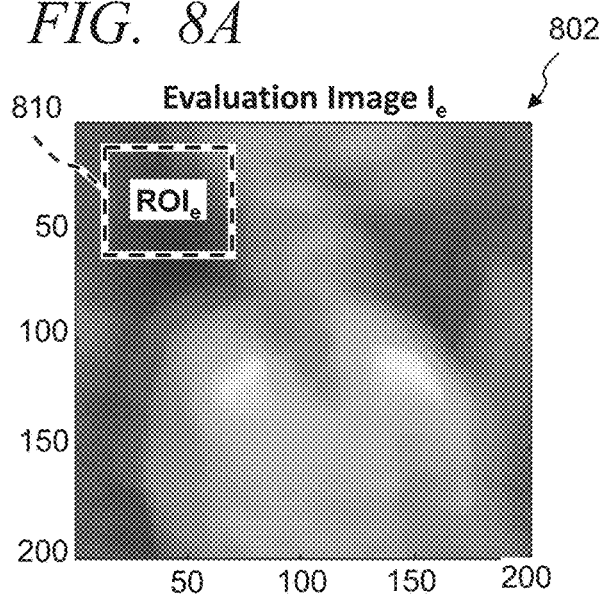
FIG. 8A Evaluation Image $I_e$
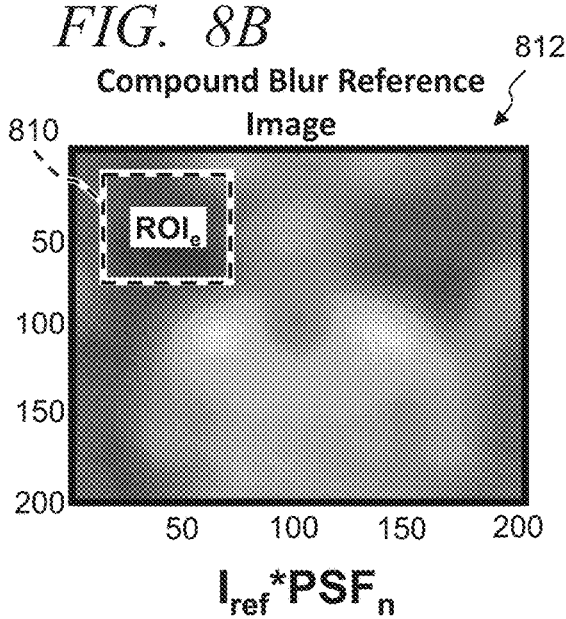
FIG. 8B Compound Blur Reference Image
$I_{ref} * PSF_n$
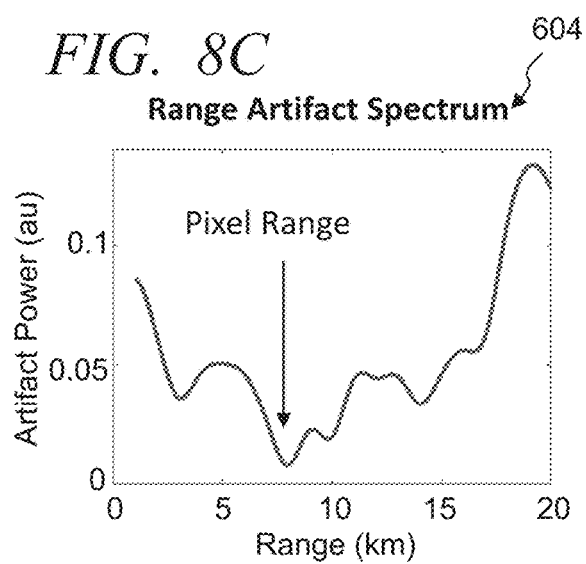
FIG. 8C Range Artifact Spectrum

SYSTEMS AND METHODS OF IMAGING AND/OR RANGE FINDING

TECHNICAL FIELD

This invention relates generally to range finding and/or capturing images.

BACKGROUND

Many previous distance measurement systems require the use of costly and complex set of sensors. Such sensors are typically cooperated with complex processing systems that receive the sensor data from these sensor systems. Additionally, the processing time can be ineffective for many applications. Still further, many previous systems have sizes and/or weights that can prevent them from use in many applications.

BRIEF DESCRIPTION OF THE DRAWINGS

The above and other aspects, features and advantages of several embodiments of the present invention will be more apparent from the following more particular description thereof, presented in conjunction with the following drawings:

FIG. 8A illustrates a simplified representation of an evaluation image, in accordance with some embodiments, that further identifies an evaluation image region of interest (ROI).

FIG. 8B illustrates a simplified representation of a compound blurred reference image, in accordance with some embodiments.

FIG. 8C illustrates a graphical representation of artifact power relative to range, in accordance with some embodiments.

Figure 1:
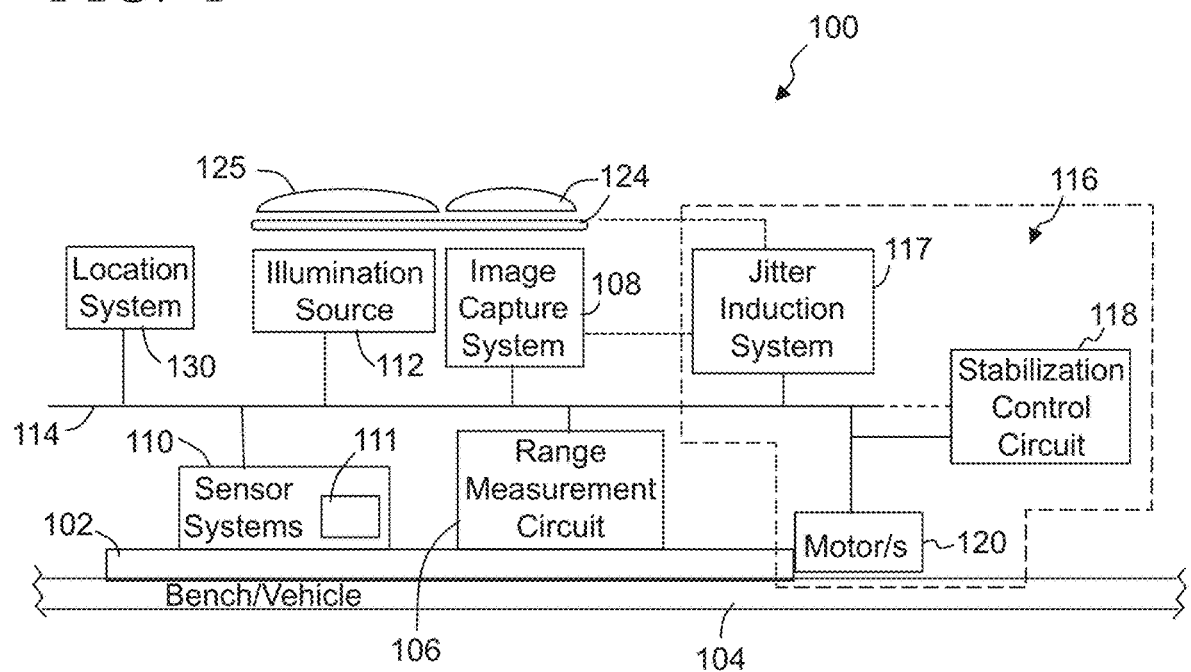
FIG. 1 illustrates a simplified block diagram of an exemplary enhanced distance measurement system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Some embodiments provide systems to accurately determine distances based on images captured by an image capture system. Captured images can be evaluated relative to point-spread-functions (PSF) and a corresponding distance to an object or target determined based on the evaluation. Some embodiments use PSFs to deconvolve some or all of an image and evaluate the deconvolved image or portion of the image relative to a reference image. Still further, some embodiments provide improved distance measuring and/or LIDAR systems that are implemented through substantially simpler electronics than other 3-dimensional (3D) LIDAR systems. Such more complex LIDAR systems often employ both complex circuitry supporting each imaging pixels and high-energy pulse lasers. Some embodiments of the present distance measurement systems and methods, however, are implemented utilizing time varying (quasi-continuous wave) laser illumination, standard commercial off-the-shelf imaging systems or cameras with known standard pixel technology, and simple sensors (e.g., gyroscope, accelerometer, other sensors or combination of two or more of such sensors).

Generally speaking, pursuant to various embodiments, systems, apparatuses and methods are provided herein useful to determine distances to objects based on one or more two-dimensional (2D) images. Additionally, some embodiments provide three-dimensional distance information based on 2D images. In some embodiments, systems are provided that determine distance to one or more objects, and comprise an image capture system; an angular movement system configured to report line of sight (LOS) angular displacement changes over time relative to the image capture system; an illumination source configured to emit an illumination pulse toward a scene of interest, the illumination pulse having a time varying amplitude; and a range measurement circuit communicatively coupled with the image capture system, the angular movement system and the illumination source. The range measurement circuit, in some embodiments, is configured to: obtain, based on at least one of measured and induced LOS angular displacement changes relative to the image capture system, a set of candidate point-spread-functions (PSFs) that each correspond to a different possible object range; deconvolve, using each candidate PSF of the set of candidate PSFs, at least a first region of interest (ROI) in a received first evaluation image obtained by the image capture system during a first integration duration of time to obtain at least a set of deconvolved ROIs of the first evaluation image, each corresponding to a respective one of the set of candidate PSFs; identify a first candidate PSF of the set of candidate PSFs that produces a respective deconvolved ROI, of the set of deconvolved ROIs resulting in a determined artifact power that is lower than a corresponding artifact power determined from the other candidate PSFs of the set of candidate PSFs; and determine a first distance corresponding to the first candidate PSF as a distance between the image capture system and a first object captured within the first ROI of the first evaluation image.

Some embodiments provide methods of determining a distance to one or more objects, comprising: controlling an illumination source to emit an illumination pulse toward a scene of interest, the illumination pulse having a time varying amplitude; controlling an image capture system to capture images; obtaining, based on a first set of at least one of measured and induced line of sight (LOS) angular displacement changes relative to the image capture system, a set of candidate point-spread-functions (PSFs) that each correspond to a different possible object range; deconvolving, using each candidate PSF of the set of candidate PSFs, at least a first region of interest (ROI) of a received first evaluation image obtained by the image capture system during the first integration duration of time to obtain at least a set of deconvolved ROIs of the first evaluation image; identifying a first candidate PSF, of the set of candidate PSFs, that produces a respective deconvolved ROI, of the set of deconvolved ROIs, resulting in a determined artifact power that is lower than a corresponding artifact power determined from the other candidate PSF of the set of candidate PSFs; and determining a first distance corresponding to the first candidate PSF as a distance between the image capture system and a first object captured within the first ROI of the first evaluation image.

Some embodiments provide systems that determine distances to one or more objects, and include an image capture system; an angular movement system configured to report line of sight (LOS) angular displacement changes over time of the image capture system; an illumination source configured to emit an illumination pulse toward a scene of interest, the illumination pulse having a time varying amplitude; and a range measurement circuit communicatively coupled with the image capture system, the angular movement system and the illumination source. The range measurement circuit is configured to: process, using each of a set of candidate point-spread-functions (PSFs), a portion of an evaluation image captured by the image capture system during a first integration duration of time of the scene of interest having been illuminated, wherein each candidate PSF is dependent on at least one of measured and induced LOS angular displacement changes during the first integration duration of time; determine a distance between the image capture system and an object at least partially captured within the portion of the evaluation image as a distance corresponding a given candidate PSF of the set of candidate PSFs resulting in an artifact power, when processing the evaluation image, that is lower than respective artifact powers determined based the processing of the evaluation image relative to the other candidate PSFs of the set of candidate PSFs.

By taking advantage of changes in the angular direction of light into the image capture system, some embodiments determine distances to one or more of those objects and/or determine a three-dimensional profile of a scene of interest being captured in one or more 2D images by one or more image capturing systems. The changes in angular direction of light may be based on movement of an image capturing system, an optical modulator that angularly redirects light to the image capture system during the integration period to cause blur, and/or the difference in time of returning illumination reflected from objects at different distances Additionally, some embodiments provide systems and methods to measure distances (ranging) by illuminating one or more objects and/or a scene with illumination (e.g., flash, laser (e.g., infrared, ultraviolet, other such lasers), and/or other illumination) and measuring the reflection with one or more sensors. The systems, in some implementations, take advantage of changes in the angular direction of light and/or differences in illumination return times of reflected illumination from the one or more objects and determine digital 3-D representations of the one or more objects and/or scene.

Some embodiments implement an imaging technique that enables range measurements, which in some instances may be a pixel-by-pixel range measurement, from one or more 2D images. Further, some embodiments utilize these range measurements to produce a 3D representation or 3D image of an object, target and/or scene.

FIG. 1 illustrates a simplified block diagram of an exemplary enhanced distance measurement system 100 (DMS), in accordance with some embodiments. The distance measurement system 100 includes at least one range measurement circuit 106 that is communicatively coupled, over one or more communication links and/or networks 114, with at least one image capture system 108, and typically one or more illumination source systems 112. The image capture system can include one or more arrays of sensors and provide an electro-optical image capture system. Some embodiments include one or more sensor systems 110, such as jitter sensor systems 111, accelerometers, gyroscopes, other such sensor, and typically a combination of two or more of such system.

The distance measurement system 100 typically includes and/or is secured with a mounting 102 that is configured to secure with a bench and/or a body 104 of a platform, which may be a stationary platform or may be a platform that moves. In some implementations, for example, the distance measurement system 100 is configured to be mounted in or on a moving vehicle and the platform is part of and/or secured with the vehicle. For example, in some instances, the distance measurement system 100 may be secured with one or more frames, beams, chassis, fuselages, other parts or combination of two or more of such parts of an aerial vehicle, a ground based vehicle, a water based vehicle, or other relevant vehicle.

In some instances, the vehicle is piloted by an onboard person, while in other implementations the vehicle may be an unmanned vehicle that autonomously or semi-autonomously controls movement of the vehicle based on one or more travel paths (e.g., flight path). Similarly, the vehicle may be an unmanned vehicle that is at least partially remotely controlled from a remote location of tens of feet to thousands of miles or more. The distance measurement system 100 may additionally or alternatively be utilized with other platforms that are subject to movement and/or other effects that can cause jitter and/or other movement of the image capture system 108. Still further, the distance measurement system 100 may be used on fixed location and/or stationary mountings, and/or while a vehicle is stopped and at least temporarily in a fixed location.

In some implementations, the mounting 102 includes movable components that allow at least part of the mounting to move relative to the body of the platform and/or relative to the vehicle. The body may include a frame, one or more support structures, joists, beams, formers, stringers, ribs, chassis, fuselage, body, skin, or the like, and the mounting 102 may be secured with one or more of such structures of the platform or vehicle. The mounting 102 may include or may be a turret system, gimbal system, or other such system, such as off the shelf or customized turret systems or gimbal systems, and that can be cooperated with a stationary platform or moving platform, such as a moving vehicle and secure the distance measurement system 100 relative to the vehicle. Further, the mounting may enable movement of the distance measurement system 100 to position the distance measurement system along a desired line of sight. As such, the mounting 102 may include or be cooperated with one or more motors mechanically cooperated to move at least the image capture system 108. In some implementations, the range measurement circuit 106 communicatively couples with the one or more motors to control the one or more motors of the mounting 102. In other embodiments, the mounting 102 includes one or more motor control circuits that control the one or more motors of the mounting 102. The motor control circuits may be communicatively coupled with the range measurement circuit 106 to receive at least some instructions to control the directional orientation of at least the image capture system 108 and/or the line of sight of the image capture system 108. In other implementations, one or more of the motor control circuits operate without input from the range measurement circuit.

In some embodiments, the range measurement circuit 106 is implemented at least in part through one or more processors, microprocessors, application specific integrated circuit (ASIC), micro-controller, other such control circuitry, or combination of two or more of such control circuitry. Some embodiments further include one or more location determination systems 130 that are configured to determine a location and/or orientation of at least the image capture system 108. The location and/or orientation information can be communicated to the range measurement circuit 106 over the one or more communication connections and/or networks 114, and/or communicated to other system components and/or to external systems. The location information, in some implementations, can include global positioning satellite (GPS) location information, accelerometer information, gyroscope information, distance information, other relevant information, and typically a combination of two or more of such information. In some embodiments, some or all of the location determination systems 130 may be part of a location system of the vehicle in which the distance measurement system 100 is positioned, while in other implementations the location determination system 130 is separate from the vehicle location system.

In some embodiments, the image capture system 108 is cooperated with the mounting 102. For example, the image capture system 108 may be fixed relative to the mounting and can be positioned or moved into position with a line of sight (LOS) of the image capture system 108 that is directed out of and away from the vehicle. One or more optics 124, 125 (e.g., lens, windows, prisms, filters, mirrors, etc.) may be part of and/or positioned relative to the image capture system 108 and/or the illumination source system 112. In some embodiments, the image capture system 108 is a digital image capture system, camera or the like with one or more arrays of pixel sensors and/or light sensors (e.g., CMOS sensors, CCD sensors, etc.), such as off-the-shelf digital imaging systems that are readily available.

The distance measurement systems and methods are configured to measure distances of less than a foot, to tens of feet, and in some instances configured to determine distances to objects at relatively long ranges of 30,000 feet or more, including measured distances from an aerial vehicle flying at heights of 30,000 feet above the ground and/or above the object of interest and higher.

It has been identified that line of angular change and/or sight jitter causes blurring of images, and typically reduces image resolution by, for example, imprinting angular blur on images as the image sensors of the image capture system 108 move during exposure integration. In some embodiments, the enhanced range or distance measurement system 100 takes advantage of the angular changes and/or jitter to identify distances to one or more objects or targets within a scene of interest. Additionally or alternatively, some embodiments include one or more angular movement systems 116 that is cooperated with the distance measurement system, image capture system 108, illumination source system 112, mounting 102 and/or other component, and is configured to manually induce a known angular displacement during at least the integration period to capture an evaluation image. Some embodiments include one or more optical modulators that angularly redirect light to the image capturing system during the integration period to induce blur in an evaluation image. The optical modulator is controlled to induce a known angular change.

In some embodiments, the one or more sensor systems 110 are configured to detect angular jitter noise, velocity, movement, tilt, rotation, and/or other such movement relative to at least the image capture system 108 that may alter and/or cause line of sight angular displacement of the image capture system 108 relative to an object being captured in images by the image capture system. One or more sensor systems 110 can be secured with the mounting 102, body 104, and/or the image capture system 108. The one or more sensor systems 110 may include one or more gyroscopes, accelerometers, inertial sensors, inertial measurement units (IMU) that are configured to detect and report one or more of a body's specific force, angular rate, sometimes the orientation of the body and other such factors (e.g., using one or more of or a combination of accelerometers, gyroscopes, sometimes magnetometers, GPS, etc.), other such sensor systems, or combination of two or more of such sensor systems. In some embodiments, the angular movement system 116 comprises a jitter sensor system 111 that is communicatively coupled with the range measurement circuit 106. The jitter sensor system, in some implementations, is configured to detect at least a series of LOS angular displacement measures over time of the image capture system 108 and communicate the series of LOS angular displacement measures to the range measurement circuit 106. In some embodiments, the range measurement circuit 106 is configured to identify, from the series of LOS angular displacement measures, the LOS angular displacement changes during at least the portion of an evaluation image integration duration.

Some embodiments utilize multiple different sensor systems to detect one or more of vibration, velocity, acceleration, angular displacement in one of multiple different directions or axes of movement, other such parameters, and in some implementations a combination of two or more of such parameters determined based on sensor data from one or more different sensor systems. Some sensor systems may additionally or alternatively be used to detect velocity, acceleration, vibration and/or angular displacement in multiple directions or along multiple axes. In some embodiments, the one or more sensor systems 110 and/or the range measurement circuit 106 is configured to obtain sensor information received from the one or more sensors (e.g., gyroscope) and use the sensor information to obtain time-dependent angular displacement, angular position and/or angular velocity of the line of sight of the image capture system over some or all of an integration period to capture an image.

The one or more illumination source systems 112 are further positioned relative to the image capture system 108 to emit illumination that is reflected by the remote object or target (and often surrounding area) being imaged, and subsequently detected by the image capture system 108. In some embodiments, the illumination source system 112 is cooperated with the mounting 102 in alignment with the line of sight of the image capture system 108. The illumination source system 112 can include one or more laser systems (e.g., infrared, ultraviolet, other such lasers), other light source or combination of two or more of such illumination sources.

As described above, some implementations optionally include one or more angular movement systems 116 coupled with the image capture system 108, one or more optics 124-125, and/or other structure. The angular movement system 116, in some embodiments, includes a jitter induction system 117 configured to induce a known angular displacement of a line of sight of the image capture system and/or a known amount of angular redirection of the light. For example, the jitter induction system 117 includes an optical modulator and/or mirrors that are controlled to induced known angular variations of the light and/or variations in the line of sight of the image capture system. Further, the angular variations are controlled at a known frequency of frequencies that are typically greater than jitter that may otherwise be affecting the line of sight, such as jitter caused by vibrations of a vehicle with which the distance measurement system 100 is secured, jitter caused by external weather conditions, other such jitter and/or a combination of two or more of such other jitter that can affect the line of sight of the image capture system.

Some implementations optionally include one or more mechanical stabilization control circuits 118 coupled with and controlling one or more motors 120 to implement movement of the mounting 102, image capture system 108, illumination source system 112, and/or other structure. Additionally or alternatively, the range measurement circuit 106 controls the one or more motors 120. The mechanical stabilization control circuit 118 and/or range measurement circuit 106 may further be configured to control the one or more motors 120 to control a direction of the field of view of the image capture system 108. In some applications, the mechanical stabilization control circuit 118 communicatively couples with the range measurement circuit 106 to receive instructions from the image capture control circuit, provide information to the image capture control circuit, and/or provide instructions to the image capture control circuit.

The one or more motors 120, when activated, implement movement of the mounting 102, image capture system 108 and/or other structures. In some instances, the range measurement circuit 106 is communicatively coupled with one or more motors 120, and/or some or all of the mechanical stabilization control circuit 118 may be implemented through the range measurement circuit 106. Other embodiments are implemented without the one or more motors 120 and/or mechanical stabilization control circuit 118. Such embodiments, in some applications, control line of sight of the image capture system 108 and/or provide at least some mechanical stabilization through control of one or more motors of the vehicle that control movement of the vehicle. In some embodiments, for example, the distance measurement system 100 is implemented in an unmanned aerial vehicle, and control of one or more motors driving one or more propellers that provide lift and/or movement for the unmanned vehicle are controlled in part to provide some mechanical pointing of the image capture system and/or stabilization.

The range measurement circuit 106 can activate the image capture system 108 to capture one or more images, and in some instances to capture video content comprising a series of frames. The frame rate at which the image capture system 108 operates can be substantially any relevant frame rate, such as but not limited to 10 frames per second, 12 frames per second, 24 frames per second or other rates. For example, in some instances the frame rate is at least 30 frames per second, and in some instances greater than 30 frames per second. Additionally, one or more other image capture systems 108 may cooperatively operate to capture additional frames. Still further, the range measurement circuit 106 can, in some applications, control the illumination source system 112 based in part on timing of the frames, the integration period per frame and/or the frame rate. In some embodiments, the range measurement circuit 106 further controls one or both of the image capture system 108 and the illumination source system 112 based on the sensor data received from the one or more sensor systems 110. Still further, the image capture system can be controlled to capture images with different integration periods.

In some embodiments, the range measurement circuit 106 is configured to receive sensor data from the one or more sensor systems 110, such as gyroscope data, acceleration data, velocity data, line of sight angular displacement data, other such sensor data or a combination of two or more of such sensor data from one or more sensor systems 110. Typically, the sensor data is received in substantially real-time. Accordingly, as the sensor data is captured and/or processed, the sensor data and/or processed sensor data is communicated to the range measurement circuit 106. Further, the sensor data is typically received at the range measurement circuit 106 just prior to and/or during each frame being captured by the image capture system 108.

Figure 2:
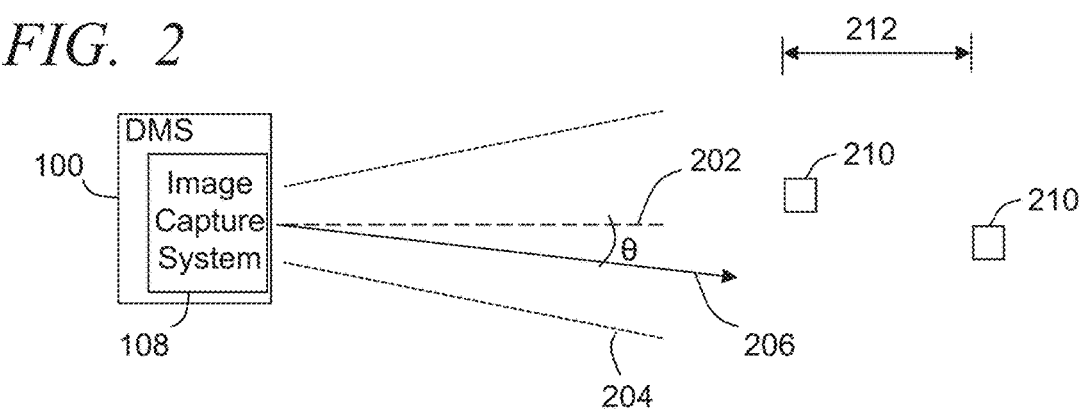
FIG. 2 illustrates a simplified block diagram of an exemplary intended line of sight within an exemplary intended field of view, in accordance with some embodiments.

FIG. 2 illustrates a simplified block diagram of an exemplary intended line of sight 202 within an exemplary intended field of view 204 of an exemplary image capture system 108, and an angular change θ of an actual line of sight 206 of the image capture system 108 in response to jitter and/or vibration, in accordance with some embodiments.

As introduced above and further described below, some embodiments implement an imaging technique that enables range measurements, which in some instances may be a pixel-by-pixel range measurement, from one or more 2D images captured by the image capture system 108. Further, some embodiments utilize these range measurements to provide a 3D LIDAR system and/or produce 3D representations or 3D images of an object, target and/or scene. Further, some embodiments utilize substantially simpler electronics than conventional 3D LIDAR system. Conventional LIDAR systems often require both complex circuitry supporting each imaging pixel and high-energy pulsed lasers. Alternatively, the distance measurement system 100 utilizes imaging techniques that utilize time varying (e.g., quasi-continuous-wave) illumination (e.g., laser), standard commercial off-the-shelf digital image capture systems with known pixel technology, and information from which to determine angular changes and/or changes in line of sight (LOS) of the image capture systems. Such information may be provided from one or more sensor systems (e.g., one or more gyroscopes, one or more accelerometers, one or more velocity sensors, other such sensors or a combination of two or more of such sensors), and/or information about known induced angular changes, such as known displacement caused by the jitter induction system 117.

A set of candidate blurring point-spread-function (PSF) can be calculated based on the combination of the determined and/or known time-dependent illumination envelopes and the determined and/or known corresponding changes in LOS (e.g., angular wander). The angular change in the LOS, in some instances, may be determined from the sensor information, while in other instances is determined based on known, induced jitter or the like. The set of candidate PSFs can then be used to blur (deconvolve) a reference image. The deconvolving with an incorrect PSFs will result in artifacts (e.g., ringing artifacts) in the deconvolved image. A correct candidate PSF corresponding to a distance from the image capture system 108 and a remote object captured in the image can be identified by the deconvolved image that results in an artifact power that has a predefined relationship with an artifact power threshold and/or results in a deconvolved image power with a lowest artifact power.

The artifact power of a deconvolved image is determined or estimated, in some embodiments, by subtracting a deconvolved image with one or more reference images, such as the previous video frame or a blind-deconvolution image of an original frame. Again, some embodiments control the angular displacement of the line of sight of the image capture system through the angular movement system 116, such as utilizing an optical modulator in the optical path that leads to a high-speed deterministic angular wander.

The range measurement circuit 106, in some embodiments, obtains a set of candidate point-spread-functions (PSFs) that each correspond to a different possible object range. As described above, the candidate PSFs can be based on one or both measured and intentionally induced LOS angular displacement changes relative to the image capture system. Some embodiments manually induce the LOS angular displacement through the jitter induction system 117, which may include one or more optical modulators, mirrors and/or other such optics that are controlled to provide known angularly redirection of the light to the camera during the integration period to intentionally cause blur in image being captured.

In some embodiments, the image capture system 108 is controlled by the range measurement circuit 106 to capture multiple images over time. These images are evaluated and/or processed relative to one or more reference images in determining one or more distances from the distance measurement system 100 to one or more object 210 or target that are captured in one or more of the images. These reference images can be images captured by one of the one or more image capture systems 108 and/or generated from an image captured by one or more of the image capture systems. In some embodiments, the range measurement circuit 106 controls an image capture system 108 to capture a reference image, and to capture a corresponding evaluation image that is evaluated relative to the reference image in determining one or more distances to one or more objects 210 in the evaluation image. Further, in some embodiments, the range measurement circuit 106 controls an image capture system 108 to capture a reference image using a reference image integration period of time, and capture a corresponding evaluation image over an evaluation image integration period of time. Typically, the evaluation image integration period is a longer period of time than the reference image integration period. Accordingly, the reference image obtains a greater signal to noise ratio, but is further subject to greater jitter over the longer evaluation image integration period. The greater jitter typically results in a greater blur in the evaluation image. Conversely, the reference image typically has significantly less blur than the evaluation image.

Figure 3:
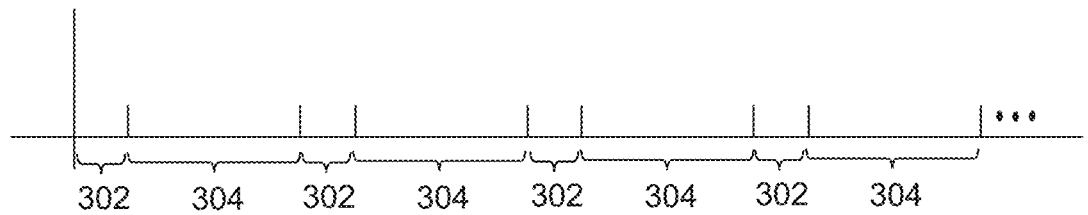
FIG. 3 illustrates an exemplary timeline showing exemplary integration periods of time for a series of reference image integration durations and corresponding evaluation image integration durations.

FIG. 3 illustrates an exemplary timeline showing exemplary integration periods of time for a series of reference image integration durations 302 and corresponding evaluation image integration durations 304. Accordingly, in some embodiments, the range measurement circuit 106 is further configured to activate one or more image capture systems 108 for a reference image integration duration of time 302 to cause the image capture system to capture the reference image of the scene of interest and the reference image integration duration of time is less than the evaluation image integration duration of time 304. The reference image integration durations 302 are illustrated as being substantially equal, and the evaluation image integration durations 304 are similarly illustrated as being substantially equal. It will be appreciated that the reference image integration durations 302 and/or the evaluation image integration durations 304 can vary over time and/or between sequential images or sets of images. Further, the integration durations illustrated in FIG. 3 are depicted without substantially no time delay between integration periods. Some embodiments, however, incorporate time delays between integration periods, and the time delays may vary, such as different delays following the reference images relative to the delays following evaluation images. In some embodiments, multiple image capture systems may be utilized, and accordingly, a reference image integration duration 302 may overlap in time with a corresponding evaluation image integration duration 304 of time when different image capture systems are used to capture the reference image versus an evaluation image (e.g., first image capture system captures a first reference image, while a second image capture system captures the evaluation image).

The reference image integration period of time is a fraction of the evaluation image integration period of time. In some implementations, the reference image integration period of time is less than 50% of the evaluation image integration period of time and typically less than 25% of the evaluation image integration period of time, while in some embodiments, the reference image integration period of time is less than 15% the evaluation image integration period of time such that a reference image is captured that is usable to identify one or more desired distances.

Additionally or alternatively, some or all of the reference images can be generated from one or more evaluation images. In some embodiments, for example, one or more reference images can be generated from one or more evaluation images through a blind deconvolution of a corresponding evaluation image through one or more known blind deconvolution techniques. Accordingly, the range measurement circuit 106 and/or a separate image processing system and/or processor, in some embodiments, performs a blind deconvolution of an evaluation image having blur and generates the corresponding reference image.

As introduced above, the distance measurement system 100 utilized the resulting blur in the evaluation images to determine one or more distances between the distance measurement system and one or objects 210 in a scene of interest that is captured in an evaluation image. Further, illumination from objects a different distances are often affected by different jitter. For example, light emitted by the illumination source (e.g., a laser) takes time to reach an object and return to the distance measurement system 100. While light is traveling to objects and back the image capture system 108 is subject to jitter (e.g., vibration and/or other causes of angular variation), whether naturally occurring and/or intentionally induced. The angular jitter results in the angle $\theta$ of the line of sight 202 of the image capture system 108 is pointing changes over time (e.g., the integration period of time). As such, time differences of returning light over time is subject to different angles $\theta$ resulting in different blur. Similarly, when there is more than one object 210 in the scene and those objects are separated by distances 212, the return times will be different, and different jitter and angular displacement affects the image capture system 108 at those different times. Depending on when illumination is detected at the image capture system, the resulting blur on the captured image will be different over the integration time of time.

In some embodiments, the distance measurement system 100 utilizes sensor data from one or more sensor systems 110 to measure motion and/or vibration relative to the line of sight of the image capture system and determine the variations over time of the angular displacement of the line of sight. Additionally or alternatively, some embodiments, include one or more jitter induction systems 117 that induce a known and intentional variations in angular displacement of the line of sight 202 of the image capture system 108 and/or intentional known variations in the direction of the light directed at the optical sensors of the image capture system 108. In some embodiments, the angular movement system 116 comprises a jitter induction system 117 that generates a series of induced LOS angular displacement changes occurring at a known rate and known angular displacement and the range measurement circuit is configured to identify, from the series of induced LOS angular displacement changes, the LOS angular displacement changes during at least the portion of the first integration duration. These measured and/or known induced line of sight angular displacements are used, in some embodiments, to determine and/or estimate an expected resulting angular blur. Based on the expected angular blur, some embodiments deconvolve an evaluation image or a portion of an evaluation image according to the expected blur that corresponds to the angular movement at different times during the integration period of time, which correspond to different distances or ranges from the distance measurement system 100. As such, some embodiments utilize the different blur within an evaluation image that correspond to each different distances and thus different 3D depths of objects within a scene captured in the evaluation image being evaluated.

Further, some embodiments utilize the detected or known angular changes of the line of sight and can obtain corresponding candidate point spread functions (PSFs). As such, a set of multiple different candidate PSFs are obtained that correspond to different ranges or distances from the distance measurement system 100. The different candidate PSFs each are subsequently utilized to deconvolve one or more portions of the evaluation image or the entire evaluation image. By deconvolving a blurred portion of an evaluation image using each candidate PSF of the set of candidate PSFs, the distance measurement system 100 obtains a set of deconvolved corresponding portions of the evaluation image (or set of deconvolved evaluation images). The deconvolved portion of the evaluation image having the lowest artifacts indicates the use of the correct candidate PSF. By identifying the correct candidate PSF the distance corresponding to that correct candidate PSF indicates the distance between the distance measurement system 100 and the one or more objects 210 within at least the deconvolved portion of the evaluation image.

Figure 4:
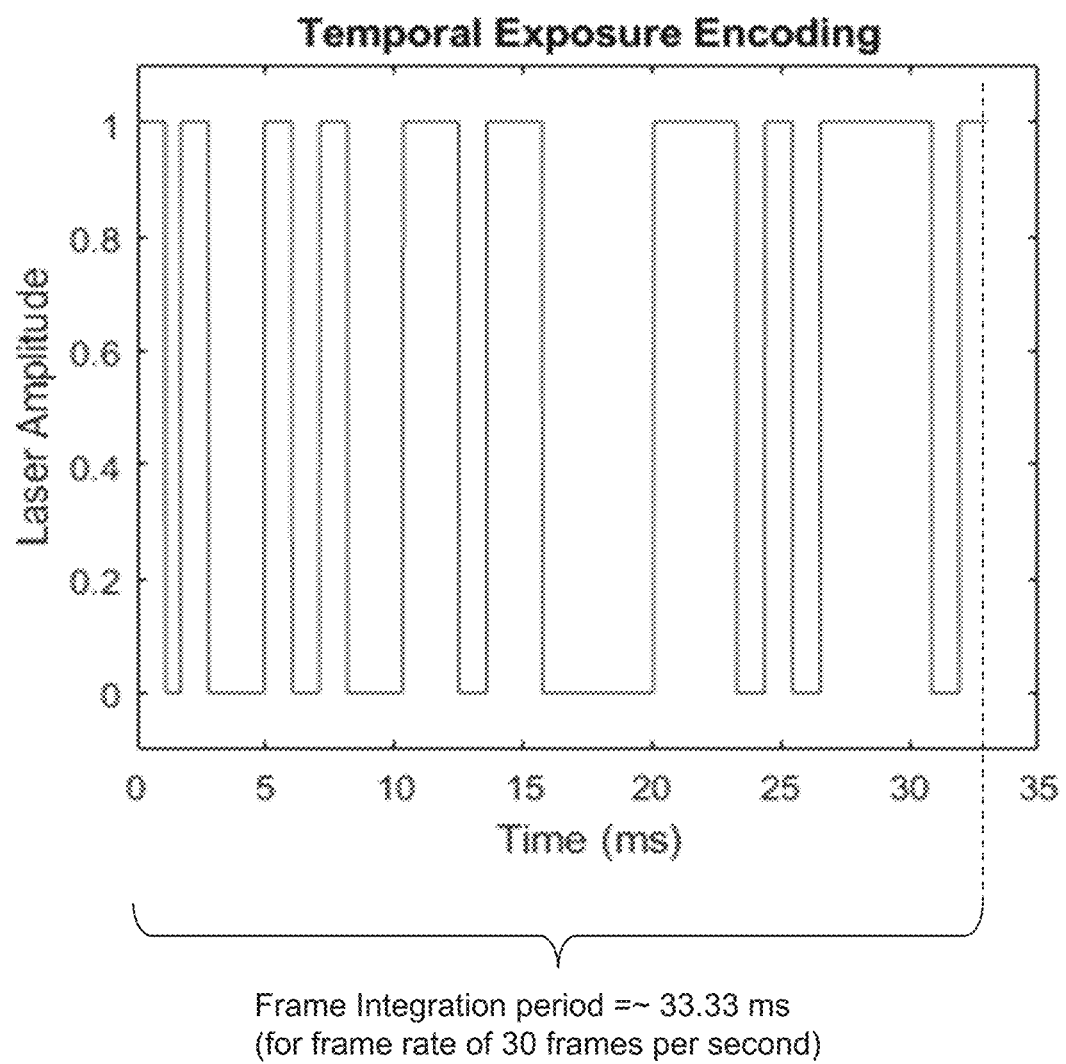
FIG. 4 illustrates a simplified graphical representation of an example pulse width modulation of illumination emitted over a period of time, in accordance with some embodiments.
Figure 5:
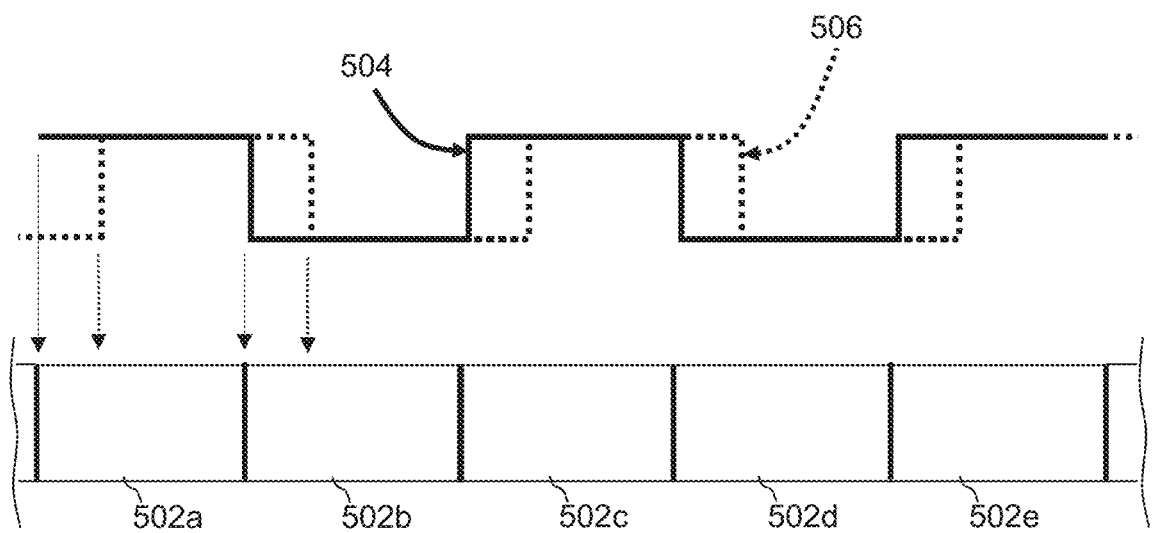
FIG. 5 shows an exemplary set of light sensors of an image capture system, in accordance with some embodiments.

Some embodiments further improve the operation of the distance measurement system 100 by controlling the one or more illumination source systems 112 to modify the illumination received from the scene of interest. In some embodiments, the range measurement circuit 106 controls the illumination source system 112 to emit illumination with a time varying amplitude or pulse width modulation. FIG. 4 illustrates a simplified graphical representation of an example pulse width modulation of illumination emitted over a period of time, such as an evaluation image integration period of time (e.g., 33 ms) or frame rate, in accordance with some embodiments. By varying the duration of the pulse widths of the pulses over time and because of the jitter, the reflected light returning from the scene impinges upon different pixels and are more readily detected in part because the time shifted version of that pulse sequence impinging at different pixels because of the movement of the line of sight of the image capture system. In some embodiments, the illumination source systems 112 is co-aligned with the line of sight 202 of the image capture system 108. Further, the illumination source system 112 may be subject to the same jitter, whether induced and/or naturally occurring, that affects the image capture system 108. As such, the FIG. 5 shows an exemplary set of light sensors 502 of an image capture system 108, in accordance with some embodiments, and first time varying light 504 impinging on the light sensors 502 and a delayed version of the time varying light 506 impinging on the light sensors 502. The delayed version of the time varying light 506 is delayed by a duration corresponding to a different distance of travel, such as reflected off of an object that is further from the distance measurement system that the object reflecting the first time varying light 504. The pulses of the first time varying light 504, as illustrated in the simplified example of FIG. 5, are each detected by a single light sensor (e.g., first pulse detected by light sensor 502a, second pulse detected by light sensor 502c, and third pulse detected by light sensor 502e). Again, the image capture system 108, and thus the light sensors 502, are subject to jitter resulting in angular changes of the line of sight.

Because of the angular change the delayed version of the time varying light 506 is typically detected by a different set of light sensors. For example, the light pulses may span multiple light sensors (e.g., first pulse detected by light sensors 502a and 502b; second pulse detected by light sensors 502c and 502d; and third pulse detected by more than light sensor 502e). Further, the time shifting of the amplitude and/or pulse width modulation enables a more accurate detection of those differences in sets of light sensors. Without the variation, each of the light sensors would receive the light and variations over time would be more difficult to detect. A light pulse with a single continuous, single amplitude pulse would result is little if any differentiation between a time shifted version of that constant signal, and effectively result in substantially the same amount of light impinging on the light sensors 502. Some embodiments control the pulse width modulation as a function of the amount jitter, whether natural and/or intentionally induced. In some embodiments, the pulse width is scaled over time as a function of an amount of time to angularly slew across a field of view of one light sensor 502 or pixel. The known induced angular variation enables a determination of a rate of change or number of angles per second change of the line of sight, and/or the sensor data enables a determination of an approximate determination of a rate of change or number of angles per second change of the line of sight. In some implementations, the pulse width can be modulated at a rate that is proportional to or is approximately equal to the angle of a single light sensor 502 divided by a time of a single pulse width or pulse cycle (on and off). For example, a rate of movement (jitter)=((angle of single pixel)/(time of single On-Off pulse)).

The set of candidate PSFs are determined, in some embodiments, as a function of angular change or range. Further, with the known time sequence of the pulse width modulation and/or the on-off pulses, and know angle of change of the line of sight that at least the image capture system moves through, whether measured or induced, the candidate PSFs are determined for different distances, with the candidate PSFs corresponding to a different known range for different light sensors or set of light sensors. The different candidate PSFs are used to evaluate different blurs and identify corresponding distances from the distance measurement system 100.

Accordingly, some embodiments obtain, based on at least one of measured and induced LOS angular displacement changes relative to the image capture system 108, a set of candidate PSFs that each correspond to a different possible object range that equate to a distance between the distance measurement system 100 and at least one object in the scene of interest. The range measurement circuit 106 utilizes the set of candidate PSFs to evaluate at least one evaluation image to identify one or more distances to one or more objects within the scene of interest captured in the evaluation image. In some embodiments, the range measurement circuit 106 deconvolves an evaluation image, or at least a first region of interest (ROI) in the received evaluation image, using each candidate PSF of the set of candidate PSFs applying one or more known deconvolution techniques.

Figure 6A:
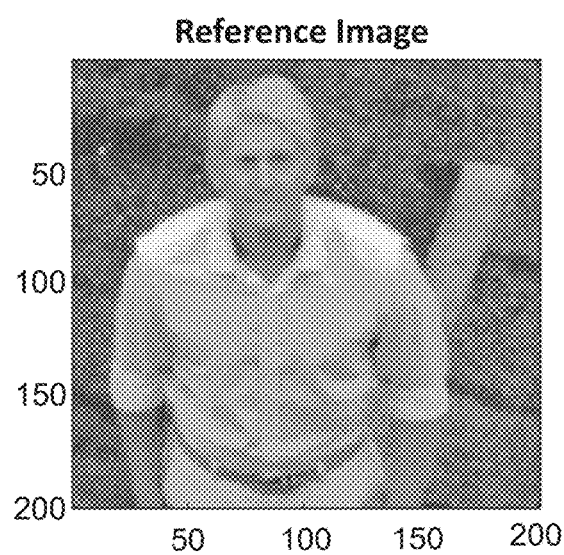
FIG. 6A illustrates a simplified representation of a reference image, in accordance with some embodiments.
Figure 6B:
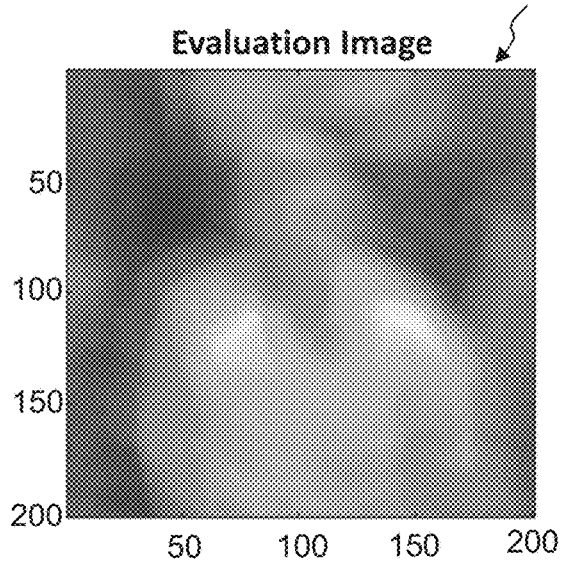
FIG. 6B illustrates a simplified representation of an evaluation image captured by the image capture system, in accordance with some embodiments.

FIG. 6A illustrates a simplified representation of a reference image 600 that is relatively clear and crisp relative to at least a corresponding evaluation and has a greater image quality that a corresponding evaluation (e.g., greater sharpness, less noise, less distortion, less blur, and/or other such factors), in accordance with some embodiments. FIG. 6B illustrates a simplified representation of an evaluation image 602 captured by the image capture system 108 over an evaluation image integration period of time 304, in accordance with some embodiments. Again, the evaluation image 602 has a lower image quality than the corresponding reference image 600. In some embodiments, the reference image 600 is captured by the image capture system 108 using a reference image integration duration of time 302 that is less than the evaluation image integration duration 304 of time. Additionally or alternatively, a reference image 600 may be generated from the evaluation image 602 through a blind deconvolution technique as is known in the art. Still further, some embodiments apply a blind deconvolution of a reference image captured with the shorter reference image integration period in order to try and obtain a higher quality, clearer and/or sharper reference image 600. Typically, the reference image 600 and the evaluation image 602 are captured relatively close in time, and in some instances one is captured directly following the capture of the other. Some embodiments may include multiple image capture systems 108 and accordingly some or all of the evaluation image integration duration 304 may overlap with some or all of the reference image integration duration 302 when the evaluation image and the reference image are captured by different image capture systems 108.

As described above and further below, the range measurement circuit 106 utilizes, in some embodiments, the set of candidate PSFs to evaluate at least one evaluation image 602 to identify one or more distances to one or more objects 210 within the scene of interest captured in the evaluation image. In some embodiments, the range measurement circuit 106 deconvolves an evaluation image, or at least a first region of interest (ROI) in the received evaluation image, using each candidate PSF of the set of candidate PSFs applying one or more known deconvolution techniques. For example, in some implementations, the range measurement circuit 106 performs a separate Wiener deconvolution of the evaluation image or ROI of an evaluation image for each candidate PSF in attempts to reduce or remove blur. For example:

$$I_B = I_0 * PSF + N$$

$$I_0(f) \approx I'_0(f) = \frac{I_0(f) \cdot \widetilde{PSF}(f)}{k + |PSF(f)|^2},$$

where $I_B$ represents a blurred evaluation image; $I_0$ represents a corresponding reference image; $I_0'$ represents an approximation of the reference image $I_0$ obtained from deconvolution; PSF is a candidate point spread function; k is a regularization constant (e.g., a number to dampen noise amplification); f is a frequency.

A candidate PSF that is inconsistent with an actual distance between the distance measurement system 100 and the object of interest and/or scene of interest produces artifacts in the deconvolved evaluation image when measured against a corresponding reference image or frame:

$$P_A = \Sigma (I'_0 - I'_{-1})^2,$$

where $P_A$ is a power of artifacts in the deconvolved evaluation image; $I_0$ represents a corresponding reference image; $I_0'$ represents an approximation of the reference image $I_0$ obtained from deconvolution; and $I_{-1}'$ represents an approximation to the reference image $I_0$.

The following example describes the deconvolving of an evaluation image 602. A subsequent example is described below regarding the use of one or more ROIs of an evaluation image relative to the reference image 600.

Figure 6C:
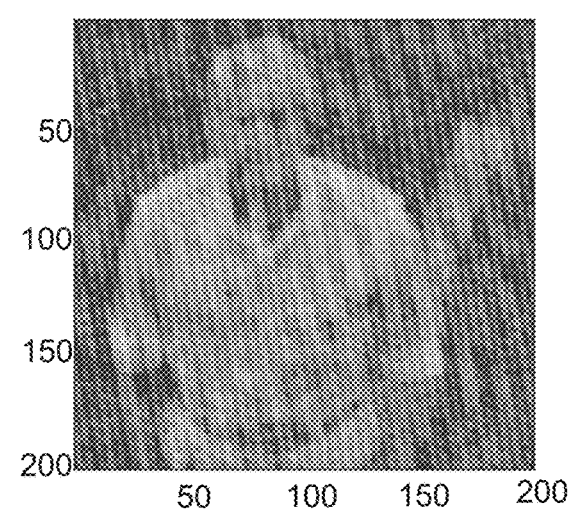
FIG. 6C illustrates an example of a deconvolved evaluation image, in accordance with some embodiments.
Figure 6D:
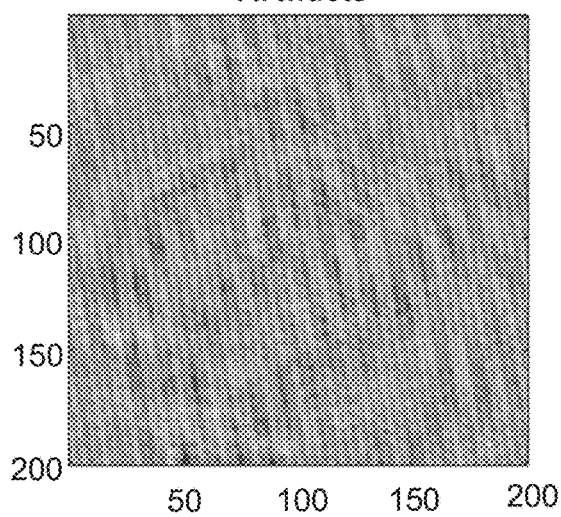
FIG. 6D illustrates an example of a correlation image determined based on an exemplary deconvolved evaluation image relative to an exemplary reference image, in accordance with some embodiments.

Based on the deconvolving of the evaluation image 602 using each candidate PSF of the set of candidate PSFs, the range measurement circuit 106 obtains a set of deconvolved evaluation images. Each deconvolved evaluation image of the set of deconvolved evaluation images corresponds to a respective one candidate PSF of the set of candidate PSFs. Some embodiments deconvolve an entire evaluation image, including any ROIs of interest, based on each candidate PSF to produce the set of deconvolved evaluation images. FIG. 6C illustrates an example of a deconvolved evaluation image 604 or de-blurred image, in accordance with some embodiments. This example of a deconvolved evaluation image 604 shows that the evaluation image has been deconvolved based on a candidate PSF that does not correspond to a distance between the distance measurement system 100 and the scene of interest, sometimes referred to as an incorrect candidate PSF. This deconvolving using the incorrect candidate PSF results in artifacts and/or inconsistencies in the deconvolved image that adversely affects the image quality. FIG. 6D illustrates an example of an exemplary correlation image 606 determined based on the exemplary deconvolved evaluation image 604 relative to the exemplary reference image 600, in accordance with some embodiments. As can be seen, the correlation image 606 shows the artifacts or differences between the example deconvolved evaluation image 604 relative to the reference image 600. In some implementations, the range measurement circuit 106 subtracts the deconvolved evaluation image 604 from the corresponding reference image to obtain the artifact power.

The evaluation image, in some embodiments, is deconvolved multiple times each based on one of the candidate PSFs of the set of candidate PSFs to produce a set of deconvolved evaluation images. Further, in some implementations, the evaluation image is deconvolved multiple times each based on only a single one of the candidate PSFs, to produce the set of deconvolved evaluation images each corresponding to just one of the candidate PSFs. The range measurement circuit 106 evaluates each of the set of deconvolved evaluation images relative to the corresponding reference image to determine an artifact power associated with each of the deconvolved evaluation images. The range measurement circuit 106, in some embodiments, further identifies one of the candidate PSFs of the set of candidate PSFs that produces a respective deconvolved evaluation image of the set of deconvolved images that results in a determined artifact power that is lower than a respective artifact power determined from the deconvolving of the evaluation image by the other candidate PSFs of the set of candidate PSFs. In some embodiments, the resulting set of deconvolved evaluation images are each evaluated relative to the same corresponding reference image 600.

Again, the LOS jitter causes range dependent blur. Some embodiments enhance the evaluation of such range dependent blur through the controlled illumination modulation in combination with LOS jitter that causes range dependent blur in the evaluation images 602. Using an incorrect PSF to deconvolve a blurred evaluation image results in an incorrect blur inversion or deconvolution, and induces artifacts or inconsistencies in the deconvolved image or at least artifacts in portions of the deconvolved image. Further, the incorrect PSFs produce artifacts at least when measured against a reference image or frame that is captured or generated (e.g., through blind deconvolution). The candidate PSFs differ in deterministic ways, allowing high signal to noise (SNR) filtering of range specific spectral artifacts.

In some embodiments, the range measurement circuit 106 subtracts each deconvolved evaluation image 604, which each corresponding to one candidate PSF of the set of candidate PSFs, from the corresponding reference image 600 to determine an artifact power or amount of artifacts resulting from the deconvolution based on the respective one of the candidate PSFs. Again, the deconvolution performed on some or all of an evaluation image 602 applying an incorrect candidate PSF (e.g., a candidate PSF that is inconsistent with the distance between the distance measurement system 100 and an object or scene of interest) leads to artifacts, ringing and/or other such inconsistencies in the resulting deconvolved evaluation image 604. Based on these evaluations, the range measurement circuit identifies a candidate PSF, of the set of candidate PSFs, that produces a respective deconvolved evaluation image 604, of the set of deconvolved evaluation images, resulting in a determined artifact power that is lower than a corresponding artifact power determined from the other deconvolved evaluation images deconvolved with the other candidate PSFs of the set of candidate PSFs.

Figure 7:
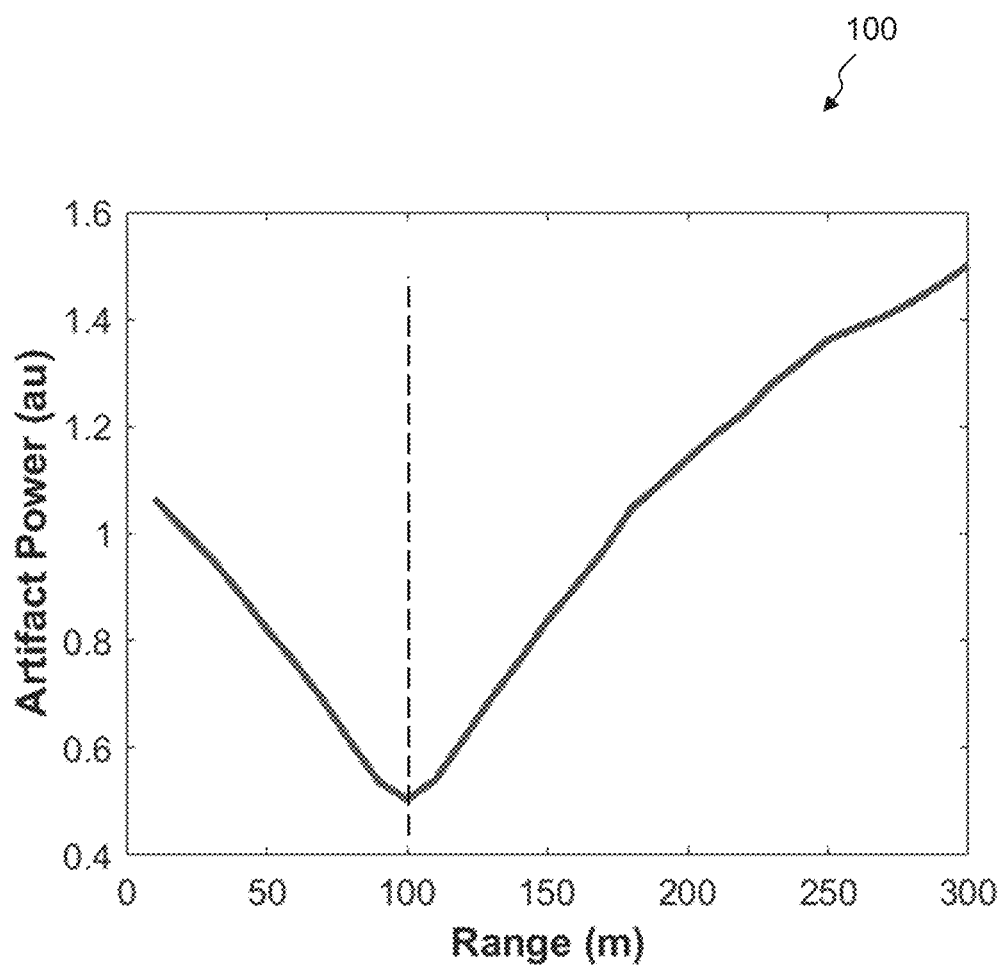
FIG. 7 illustrates a simplified graphical representation of determined artifact powers relative to distance, in accordance with some embodiments.

The different candidate PSFs correspond to different distances from the distance measurement system 100. As such, in some embodiments, based on the identified candidate PSF that produces a deconvolved evaluation image with the lowest artifact power, the range measurement circuit 106 determines a distance that corresponds to that identified candidate PSF, and defines that corresponding distance as a distance between the image capture system 108 and an object 210 or scene captured within the evaluation image 602. FIG. 7 illustrates a simplified graphical representation of determined artifact powers, from a set of deconvolved evaluation images according to the set of candidate PSFs, relative to distance or range between the distance measurement system 100 and an object of interest and/or scene of interest, in accordance with some embodiments. As illustrated, a deconvolved evaluation image having a lowest artifact power (approximately 0.5 au in FIG. 7) corresponds to a distance (e.g., 100 m) that corresponds to the candidate PSF used to deconvolve the evaluation image and that resulted in the lowest artifact power.

It was further identified that the candidate PSFs corresponding to neighboring close distances or ranges (i.e., similar or close ranges) are very similar. As such, when deconvolving using these similar PSFs result in differences that are substantially indistinguishable (e.g., when subtracted) and differences are more likely resulting from noise in the evaluation image. Some embodiments consider portions of an evaluation image and identify those portions of the evaluation image where the PSFs are particularly different or a threshold difference from the reference image. These portions of the evaluation image are used in evaluating PSFs and those areas where PSFs are relatively the same are, in some instances, not considered.

In some embodiments, the range measurement circuit, in obtaining the set of candidate PSFs, is configured to weight aspects of each of the candidate PSFs relative to the other candidate PSFs of the set of candidate PSFs, and apply the weightings to highlight differences when performing the deconvolving of the evaluation image, and/or a ROI, by each of the candidate PSFs. The range measurement circuit 106 in weighting the aspects of each of the candidate PSFs, in some implementations, is configured to convert each of the candidate PSFs of the set of candidate PSFs into the frequency domain to obtain a set of candidate frequency domain PSFs. Such a conversion, in some implementations, includes applying a Fourier transform of each of the candidate PSFs of the set of candidate PSFs to put the PSFs into frequency domain. These frequency domain PSFs are statistically evaluated and the range measurement circuit 106 identifies regions of frequency domain where the candidate PSFs differ the most and/or have a threshold difference. In some embodiments, a standard deviation of the candidate frequency domain PSFs is determined to identify locations in frequency space where the PSFs are the most different. Then use those frequency components in deconvolving respective portions of the evaluation image and considering those artifacts that were caused in those frequency locations. This, in part, can avoid false detection of artifacts caused by noise in the evaluation image. Accordingly, some embodiments take advantage of candidate PSFs differing in deterministic ways to enable high SNR filtering of range specific spectral artifacts. For example, $$\sigma_0 = \sigma\left(\frac{\widetilde{PSF}(f)}{k + |PSF(f)|^2}\right) \rightarrow P_A = \sum \sigma_0 \cdot |I_0' - I_{-1}'|^2,$$

where $\sigma_0$ is the standard deviation of the frequency space of the set of candidate PSFs, and $\Sigma(\ldots)$ denotes a summation. When an evaluation image or ROI is deconvolved, each deconvolved image or ROI of the set of deconvolved ROIs corresponds to a respective one candidate PSF of the set of candidate PSFs.

Some embodiments provide more precision distance measurements and/or enable LIDAR through the evaluation of distances or ranges through multiple different portions of an evaluation image or multiple evaluation images. It is common that an evaluation image is associated with multiple different distances from the distance measurement system throughout the evaluation image. Accordingly, there is different times durations or times of flight of light reflecting from different objects 210 within a scene of interest corresponding to different regions or portions of an evaluation image. This provides different regions of the evaluation image that are blurred different that other regions of the evaluation image. Different blurred regions of the evaluation image will correspond or match with different candidate PSFs.

As described above, some embodiments evaluate one or more regions of interest (ROIs) of an evaluation image 602 to determine one or more ranges or distances corresponding to the one or more ROIs and/or an object captured in the respective ROI. FIG. 8A illustrates a simplified representation of an evaluation image 702 ($I_e$) captured by the image capture system 108 over an evaluation image integration period of time, in accordance with some embodiments, that further identifies an evaluation image ROI 810 (ROI$_e$). For simplicity, only a single ROI 810 is illustrated. It will be appreciated that multiple different ROIs 810 may be considered, and in some instances two or more of those ROIs may partially overlap.

In some embodiments, the range measurement circuit 106 blurs the reference image 600 based on each candidate PSF ($I_{ref}$*PSF$_n$) or weighted candidate PSF to produce a set of blurred reference images, each corresponding to one of the respective candidate PSFs. An evaluation image ROI 810 from the evaluation image 802 is copied or extracted from the evaluation image, and a corresponding reference image ROI (e.g., same pixel array or matrix) in each blurred reference image, of the set of blurred reference images, is replaced by the evaluate image ROI to produce a set of modified or compound blurred reference images 812. FIG. 8B illustrates a simplified representation of a compound blurred reference image 812, in accordance with some embodiments, that includes the evaluation image ROI 810 in place of the corresponding reference image ROI.

As such, each compound blurred reference image 812 includes at least one evaluation image ROI 810 from the evaluation image. The compound blurred reference image 812 (e.g., blurred according to PSF$_1$) is subsequently deconvolved using the corresponding candidate PSF that was used to blur the reference image (e.g., PSF$_1$ in this example). The artifact power is determined from each deconvolved compound reference image relative to the original reference image. In some instances, the artifact power is determined at least in part by subtracting the deconvolved compound reference image from the original reference image. The candidate PSF that produces the lowest artifact power for at least the ROI is identified. This identified PSF corresponds to the distance of at least one object in that ROI. A distance between the distance measurement system 100 and an object in the scene of interest associated with the RIO is determined based on the identified candidate PSF that produces the lowest artifact power. Again, this ROI evaluation can be repeated for multiple different ROIs across the evaluation image to obtain multiple different distances or ranges corresponding to different portions of the evaluation image and thus different objects within the scene captured in the evaluation image. The multiple different distances effectively provides a LIDAR with a grid of distances from the distance measurement system 100.

As such, in some embodiments, for each of multiple different ROIs of an evaluation image, the range measurement circuit 106 replaces, within each of the blurred reference images of the set of blurred reference images, a second blurred reference image ROI with a second evaluation image ROI of the evaluation image to obtain a second set of compound blurred reference images. The second ROI is different than a previous ROI (e.g., different matrix of pixels). Each of the compound blurred reference images of the second set of compound blurred reference images is deconvolved relative to the respective PSF used to blur the reference image, and a second set of deconvolved compound reference images are obtained. The range measurement circuit 106 evaluates each of the deconvolved compound reference images of the second set of deconvolved compound reference images relative to the reference image and identifies a second candidate PSF that produces a second deconvolved compound reference image, of the second set of deconvolved compound reference images, that results in a determined second artifact power relative to the reference image that is lower than a corresponding second artifact power determined for the ROI from the deconvolved compound reference images of the second set of deconvolved compound reference images. A second distance is determined that corresponds to the second candidate PSF defining a distance between the image capture system and a second object captured within the second ROI of the first evaluation image, wherein the second distance is different than the first distance.

The size of the ROI can be substantially any relevant size and the spacing and/or shift between ROIs can include substantially any relevant amount. Some embodiments randomly select ROIs, while other embodiments process the evaluation image in attempts to predict areas corresponding to differing distances. Additionally or alternatively, some embodiments select a fixed size (e.g., a fixed number of pixels) of an ROI, and select a first ROI from the evaluation image having on the selected fixed size. A second ROI having the same fixed size can similarly be selected over a different portion of the evaluation image with the second ROI overlapping the first ROI. By evaluating artifact power differences between the first ROI and the second ROI the range measurement circuit can identify those pixels that correspond to different PSFs. For example, by identifying an artifact power decrease as the ROI is shifted (e.g., decrease in artifact power relative to the second ROI versus an artifact power relative to the first ROI), the range measurement circuit 106 identifies that the pixels that are part of the first ROI and not part of the second ROI do not correspond with the candidate PSF and are at a different range that the portion of the evaluation image corresponding to the second ROI. This shift of ROI can be repeated substantially any number of times in order to repeatedly evaluate different portions of the evaluation image and identify more accurate differences in range relative to those differences in ROIs and/or sets of pixels based in part on the overlap of ROIs and the multiple iterations of evaluation of the shifted ROIs. This shifting further enables the selection of a larger RIO (e.g., larger number of pixels) when the shift is a relatively small number of pixels.

FIG. 8C illustrates a graphical representation of artifact power relative to range, in accordance with some embodiments. The lowest artifact power corresponds to the candidate PSF (e.g., $PSF_{\#127}$) that deconvolves the compound reference image to result in the lowest artifact power. This candidate PSF is then used to identify the distance to the object or objects captured in that evaluation image ROI. In some embodiments, the number of candidate PSFs of the set of candidate PSFs is a function of signal to noise. The pulse sequence is known, and the motion of line of sight is known. The range measurement circuit 106 can calculate the set of candidate PSFs for substantially any number of variations in time of arrival of light at the image capture system based on the known pulse sequence and known change in line of sight. Some embodiments limit the difference or intervals in time considered as a function of signal to noise and identifying when intervals of time are likely to provide no or minimal difference.

Figure 9:
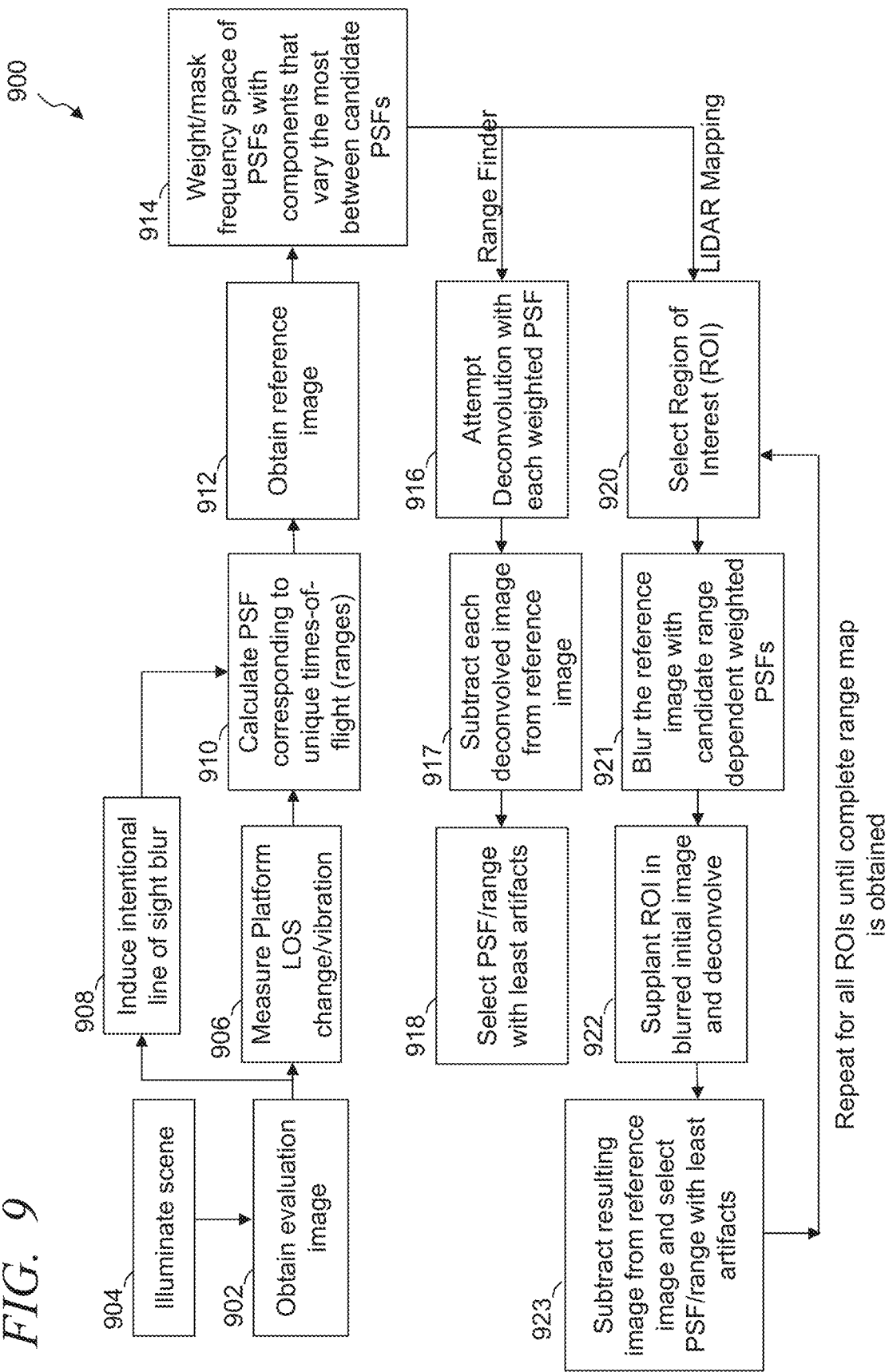
FIG. 9 illustrates a simplified flow diagram of an exemplary process of determining a distance to one or more objects, in accordance with some embodiments.

FIG. 9 illustrates a simplified flow diagram of an exemplary process 1000 of determining a distance to one or more objects, in accordance with some embodiments. In step 902, one or more evaluation images are obtained of a scene of interest. In some embodiments, the process includes step 904 where an illumination source system 112 is controlled to illuminate the scene of interest at least during a portion of an evaluation image integration period of time. The illumination source system 112, is controlled, in some implementations, to provide a pulse width modulated illumination with the pulse widths varying over time, and in some instances the pulse width is varying between each pulse.

Some embodiments include one or both of steps 906 and 908. In step 906 changes in LOS and more vibrations are measured. Additionally or alternatively, in step 908 changes in LOS are induced with known variations. In step 910 a set of candidate PSFs are determined through one or more known techniques. Each candidate PSF corresponds to a different, unique time of flight of light to return to the image capture system and/or a range from the image capture system to an object in a scene of interest. In step 912, a reference image is obtained. In some embodiments the reference image is obtained through a blind deconvolving of the captured evaluation image. In other implementations, a separate reference image is captured by the image capture system 108. The reference image integration period of time is typically less than the evaluation image integration period of time. Further, the illumination source system 112 may be controlled to illuminate the scene of interest duration at least some of the reference image integration period. Some embodiments additionally perform a blind deconvolution of the captured reference image in attempts to further enhance an image quality of the reference image. Further, some embodiments control the illumination source system 112 to illuminate the scene of interest while capturing the reference image.

In step 914, the set of PSFs are transformed through a Fourier transform into the frequency domain and the frequency space of the PSFs are evaluated to identify and weight those components of the frequency domain that vary the most between candidate PSFs and/or have at least a threshold variation between candidate PSFs. In some instances, for example, the variations are statistically evaluated to identify a threshold (e.g., a standard deviation from a mean variation, two standard deviations from the mean, and/or other such evaluations).

In some embodiments, the process 900 includes a range finding sub-process that includes steps 916-918. In step 916, the evaluation image is deconvolved according to each candidate PSF to generate a set of deconvolved evaluation images, with each deconvolved evaluation image having been deconvolved according to a respective one of the candidate PSFs. In step 917, the deconvolved evaluation images are evaluated relative to the reference image. In some implementations, the deconvolved evaluation images are subtracted from the reference image and a corresponding artifact power is determined. In step 918, a candidate PSF is identified that results in a deconvolved evaluation image that results in a lowest artifact power, and a distance is identified between the distance measurement system 100 and the scene of interest and/or one or more objects in a scene of interest that corresponds with the identified candidate PSF that results in the lowest artifact power.

In some embodiments the process 900 additionally or alternatively includes a LIDAR mapping sub-process that includes steps 920-923. In step 920, a region of interest (ROI) in the evaluation image is selected. In step 921, the reference image is blurred based on each candidate PSF that is range dependent and in some instances is weighted, to obtain a set of blurred reference images each blurred according to one of the candidate PSFs. In step 922, a corresponding reference image ROI in each blurred reference image is replaced by the selected ROI of the evaluation image to provide a set of compound reference images each corresponding to a respective one of the candidate PSFs. Each of the compound reference images is further deconvolved using the corresponding candidate PSF.

In step 923, the deconvolved compound reference images are each evaluated relative to the reference image. In some implementations, the deconvolved compound reference images are subtracted from the reference image and a corresponding artifact power is determined. A candidate PSF is identified that results in a deconvolved reference image that results in a lowest artifact power, and a distance is identified between the distance measurement system 100 and one or more objects in at least part of the ROI that corresponds with the identified candidate PSF that results in the lowest artifact power for that ROI. The LIDAR mapping sub-process is typically repeated multiple times for each additional ROI selected in the evaluation image to obtain a mapping or matrix of distances between the distance measurement system 100 and multiple different objects that are at least partially captured in one or more of the regions of interest of the evaluation image. Similarly, the process 900 can be repeated for the any number of evaluation frames or images to continue to determine distances and/or LIDAR mapping.

Figure 10:
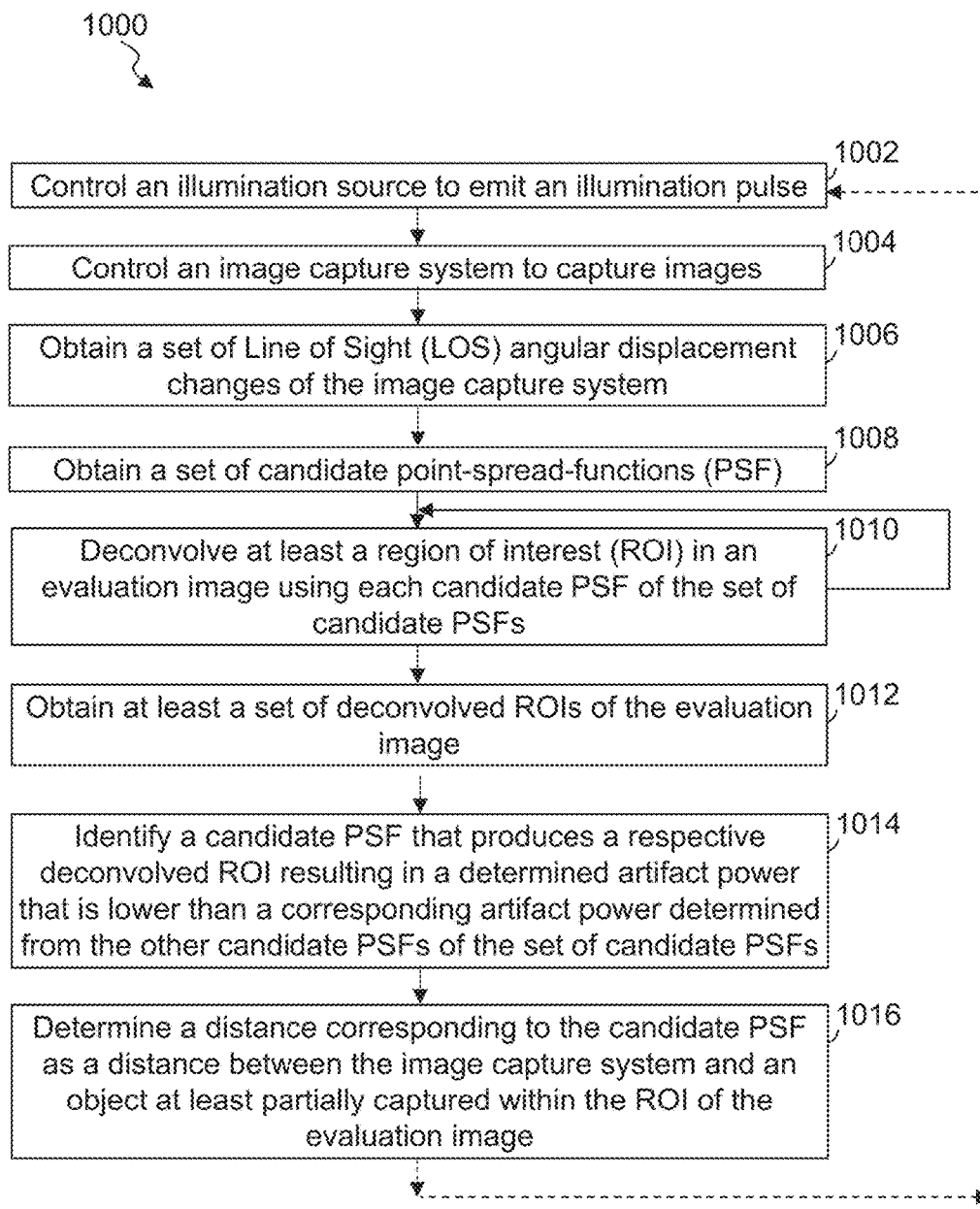
FIG. 10 illustrates a simplified flow diagram of an exemplary process of determining a distance to one or more objects, in accordance with some embodiments.

FIG. 10 illustrates a simplified flow diagram of an exemplary process 1000 of determining a distance to one or more objects, in accordance with some embodiments. In step 1002, one or more illumination source systems 112 is controlled to emit illumination directed toward a scene of interest. In some implementations the illumination source is controlled to emit one or more illumination pulses having a time varying amplitude with the pulse width changing over time. In step 1004, one or more an image capture systems 108 are controlled or otherwise activated to capture one or more images. The captured images include at least one evaluation image. In some embodiments, the image capture system is further controlled to capture a reference image. Typically, in capturing the reference image, the image capture system 108 is activated for a reference image integration duration of time causing the image capture system to capture the reference image of the scene of interest, and the reference image integration duration of time is typically less than an evaluation image integration duration of time. The reference images may additionally or alternatively be generated based on a blind deconvolution of a corresponding one of the evaluation images. Some embodiments further perform blind deconvolution on reference images captured by the image capture system in attempts to improve the quality of the reference image.

In some embodiments, the image capture system 108 captures a series of images over time. Additionally or alternatively, the image capture system may be configured to capture video content comprising a series of images or frames at controlled frame rates. The frame rates may change over time and/or between frames. For example, the frame rate may include a reference image integration frame rate or duration for a reference image followed by one or more longer evaluation image integration frame rates or durations to capture one or more evaluation images.

In step 1006, a set of LOS angular displacement changes of the image capture system are obtained. Again, the set of LOS angular displacement changes may be detected through one or more sensors and/or may be intentionally induced with known amounts and rates of angular displacement. Further, in some embodiments, the LOS angular displacements are identified during the evaluation image integration duration of time. In step 1008, a set of candidate PSFs are obtained based on at least one of measured and/or induced LOS angular displacement changes relative to the image capture system. The set of candidate PSFs each correspond to a different possible object range. In step 1010, a received evaluation image, obtained by the image capture system 108 during an evaluation image integration duration of time, is deconvolved using a candidate PSF. In some implementations, at least a ROI in a received evaluation image is deconvolved using a candidate PSF. Step 1010 can be repeated for each candidate PSF so that the evaluation image, or ROI, is deconvolved once based on each candidate PSF of the set of candidate PSFs.

In step 1012, a set of evaluation images, or at least a set of deconvolved ROIs of the evaluation image, are obtained based on the deconvolving of the evaluation image. Again, each deconvolved evaluation image, or deconvolved ROI, corresponds to a respective one candidate PSF of the set of candidate PSFs. In step 1014, a candidate PSF, of the set of candidate PSFs, is identified that produces a respective deconvolved evaluation image (or a deconvolved ROI of the set of deconvolved ROIs) resulting in a determined artifact power that is lower than a corresponding artifact power determined from the other candidate PSFs of the set of candidate PSFs. In step 1016, a distance corresponding to the identified candidate PSF is determined to be a distance between the image capture system and an object that is at least partially captured within the evaluation image and/or the ROI of the evaluation image.

Figure 11:
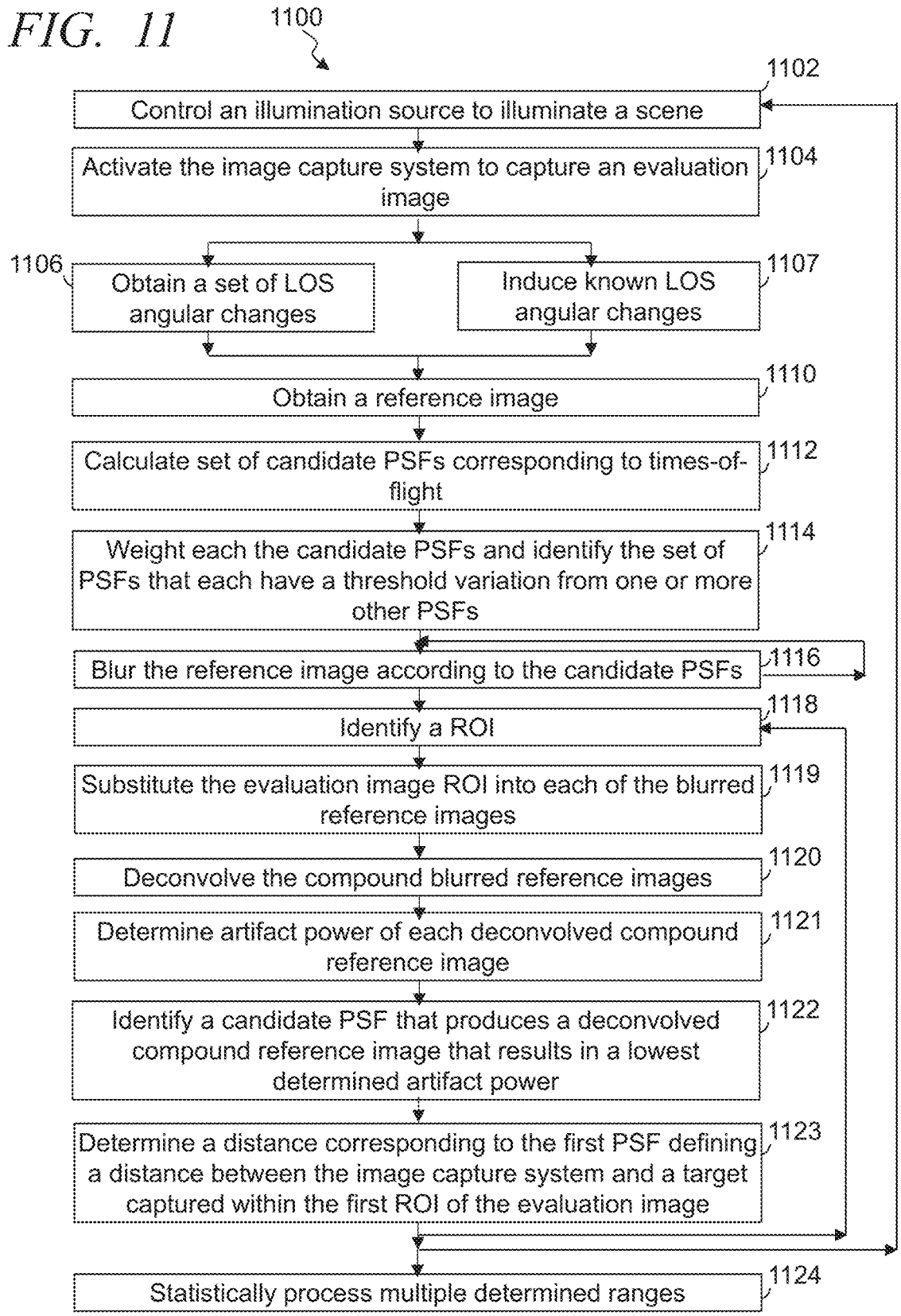
FIG. 11 illustrates a simplified flow diagram of an exemplary process of determining a LIDAR mapping of distances to one or more objects of a scene of interest, in accordance with some embodiments.

FIG. 11 illustrates a simplified flow diagram of an exemplary process 1100 of determining a LIDAR mapping of distances to one or more objects of a scene of interest, in accordance with some embodiments. In step 1102, one or more illumination source systems 112 is controlled to emit illumination directed toward the scene of interest. In some implementations the illumination source system is controlled to emit one or more illumination pulses having a time varying amplitude with the pulse width changing over time. In step 1104, one or more an image capture systems 108 are controlled or activated to capture one or more images. The captured images include at least one evaluation image.

In optional step 1106, a set of LOS angular displacement changes of the image capture system are detected through one or more sensors. In some embodiments, a series of LOS angular displacement measures of the image capture system are received over time from a jitter sensor system during at least a portion of the evaluation image integration duration of time. The LOS angular displacement changes during at least the portion of the integration duration are identified from the series of LOS angular displacement measures. Additionally or alternatively, some embodiments include step 1107 where known LOS angular displacement changes are intentionally induced with known amounts and rates of angular displacement at least during some or all of the evaluation image integration duration. In some embodiments, a series of induced LOS angular displacement changes are generated through one or more jitter induction system 117. Accordingly, in some implementations, the LOS angular displacement changes are identified from the series of known LOS angular displacement changes during at least a portion of the evaluation image integration duration.

In step 1110, a reference image is obtained. In some embodiments, a reference image of the scene of interest is obtained based on a reference image captured by the image capture system. Typically, in capturing the reference image, the image capture system 108 is activated for a reference image integration duration of time causing the image capture system to capture the reference image of the scene of interest, and the reference image integration duration of time is typically less than an evaluation image integration duration of time. The reference images may additionally or alternatively be generated based on a blind deconvolution of a corresponding one of the evaluation images. Some embodiments further perform blind deconvolution on reference images captured by the image capture system in attempts to improve the quality of the reference image.

In some embodiments, the image capture system 108 captures a series of images over time. Additionally or alternatively, the image capture system may be configured to capture video content comprising a series of images or frames at controlled frame rates. The frame rates may change over time and/or between frames. For example, the frame rate may include a reference image integration frame rate or duration for a reference image followed by one or more longer evaluation image integration frame rates or durations to capture one or more evaluation images.

In step 1112, a set of candidate PSFs are obtained based on at least one of measured and/or induced LOS angular displacement changes relative to the image capture system. The set of candidate PSFs each correspond to a different possible object range and/or differences in times of flight of the illumination. In step 1114, aspects of each of candidate PSF of the set of candidate PSFs are weighted relative to the other candidate PSFs of the set of candidate PSFs. In some embodiments, the weighting of the aspects of each of the candidate PSFs comprises converting each of the candidate PSFs of the set of candidate test PSFs into frequency domain to obtain a set of candidate frequency domain PSFs. These candidate frequency domain PSFs are statistically evaluated to identify regions of the frequency domain where the candidate PSFs differ the most and are used in emphasizing differences in resulting deconvolved images using each of the candidate PSFs.

In step 1116, the reference image is repeatedly blurred according to a different one of the candidate PSFs of the set of candidate PSFs to obtain a set of blurred reference images each corresponding to one of the candidate PSFs of the set of candidate PSFs. Typically, this blurring is performed for each candidate PSF of the set of candidate PSFs. In step 1118, an evaluation image ROI is identified in the evaluation image. In step 1119, a corresponding blurred reference image ROI is replaced with the evaluation image ROI of the evaluation image. This is repeated for each blurred reference image of the set of blurred reference images providing a set of compound blurred reference images each comprising the evaluation image ROI.

In step 1120, each of the compound blurred reference images are deconvolved based on a respective candidate PSF that was used to blur the reference image, and a set of deconvolved compound reference images are obtained. In some embodiments, the deconvolving include applying the weightings to highlight differences when performing the deconvolving of the ROI and/or compound reference image by each of the candidate PSFs of the set of candidate PSFs. In step 1121, each of the deconvolved compound reference images is evaluated relative to the reference image to identify a corresponding artifact power. In step 1122, one of the candidate PSFs is identified that produces a deconvolved compound reference image, of the set of deconvolved compound reference images, that results in a determined artifact power relative to the reference image that is lower than the corresponding artifact power determined from the other candidate PSFs of the set of candidate PSFs. In step 1123, a distance corresponding to the identified candidate PSF is determined to be a distance between the image capture system and an object that is at least partially captured within the evaluation image and/or the ROI of the evaluation image. Steps 1118-1123 are repeated numerous times for each of multiple different evaluation image ROIs to generate a matrix or mapping of distances between the distance measurement system 100 and multiple different objects that are at least partially captured in one or more of the ROIs of the evaluation image.

Further, in some embodiments, the process 1100 can be repeated any number of times to repeatedly evaluate images to continue to generate matrices or mappings of distances between the distance measurement system 100 and one or more objects that are at least partially captured in one or more of the sequence of multiple evaluation images. Additionally, in some embodiments, the process 1100 include option step 1124 where multiple range or distance measures for one or more objects and/or a scene are collectively evaluated through one or more statical processes to enhance an accuracy and/or confirm a reliability of a measured distance. Some embodiments, for example, average multiple determined distances between the distance measurement system 100 and an object determined based on two or more of a series of evaluation images and/or frames. The averaging in part can reduce a margin of error of a single frame. Some embodiments additionally or alternatively statistically evaluate determined distances in selecting distances that are further processed, such as eliminating distances that are beyond one or more standard deviations, and/or other such processing, evaluation and/or statical evaluation of sets of distances identified over a series of images captured over time (e.g., multiple evaluation images from images captured at a set frame rate).

As such, some embodiments use multiple frames (sequence of frames) to obtain range information of the images to determine a set of multiple different ranges for different portions of the one frame, and use respective set of ranges from the multiple sequential evaluation images or frames and determine a statistically processed range for each set. Such statistical processing, in some implementations, compensates for the error in a single frame (e.g., error often varies from frame to frame, and by averaging the system reduces the effect of an error relative to a single frame). Additionally, a sequence of evaluation images, in some implementations, provides increases in resolution and/or providing a greater signal to noise.

Figure 12:
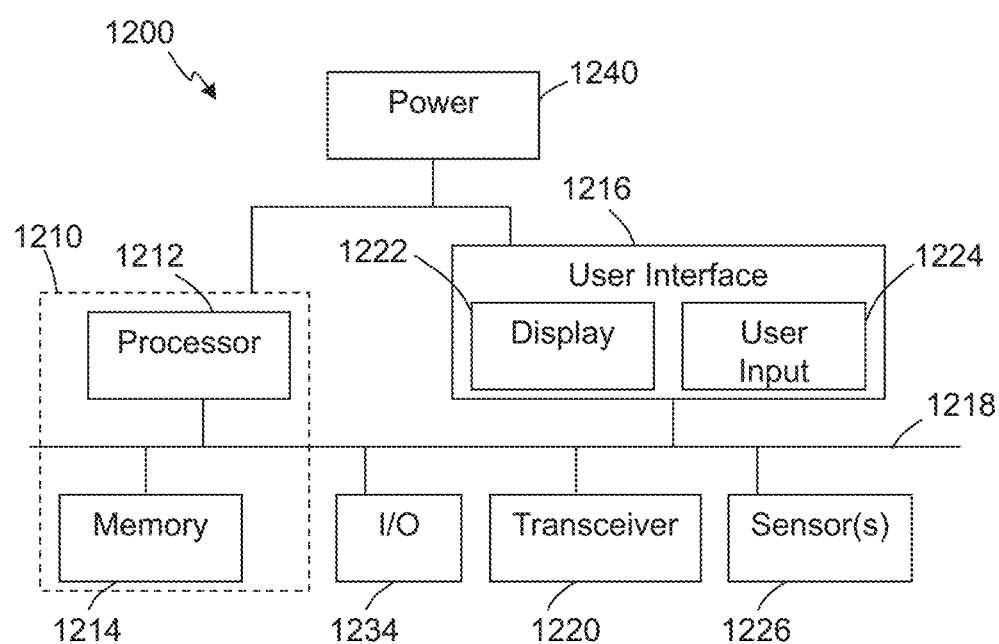
FIG. 12 illustrates an exemplary system for use in implementing systems, methods, processes, techniques, circuits, devices, apparatuses and the like in determining distances, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 12 illustrates an exemplary system 1200 that may be used for implementing any of the components, circuits, circuitry, systems, functionality, apparatuses, processes, or devices of the distance measurement system 100 FIG. 1, and/or other above or below mentioned systems or devices, or parts of such circuits, circuitry, functionality, systems, apparatuses, processes, or devices. For example, the system 1200 may be used to implement some or all of the range measurement circuit 106, image capture system 108, illumination source system 112, sensor systems 110, stabilization control circuit 118, jitter induction system 117, location system 130, and/or other such components, circuitry, functionality and/or devices. However, the use of the system 1200 or any portion thereof is certainly not required.

By way of example, the system 1200 may comprise one or more control circuits and/or processor modules 1212, one or more memory 1214, and one or more communication links 1218, paths, buses or the like. Some embodiments may include one or more user interfaces 1216, and/or one or more internal and/or external power sources or supplies 1240. The control circuit 1212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1212 can be part of control circuitry and/or a control system 1210, which may be implemented through one or more processors with access to one or more memory 1214 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1200 may be used to implement one or more of the above or below, or parts of, components, circuits, systems, processes and the like.

The optional user interface 1216 allows a user to interact with the system 1200 and receive information through the system. In some instances, the user interface 1216 includes a display 1222 and/or one or more user inputs 1224, such as buttons, touch screen, track ball, keyboard, mouse, etc., which can be part of or wired or wirelessly coupled with the system 1200. Typically, the system 1200 further includes one or more communication interfaces, ports, transceivers 1220 and the like allowing the system 1200 to communicate over a communication bus, a distributed computer and/or communication network 114 (e.g., a local area network (LAN), the Internet, wide area network (WAN), etc.), communication link 1218, other internal and/or external communication networks or communication channels with other devices and/or other such communications or combination of two or more of such communication methods. Further the transceiver 1220 can be configured for wired, wireless, optical, fiber optical cable, satellite, or other such communication configurations or combinations of two or more of such communications. Some embodiments include one or more input/output (I/O) ports 1234 that allow one or more devices to couple with the system 1200. The I/O ports can be substantially any relevant port or combinations of ports, such as but not limited to USB, Ethernet, or other such ports. The I/O interface 1234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1226 to provide information to the system and/or sensor information that is communicated to another component, such as the range measurement circuit 106, the image capture system 108, a vehicle, etc. The sensors can include substantially any relevant sensor, such as the angular movement system 116, a jitter induction system 117, gyroscope, accelerometer, velocity sensor, distance measurement sensors (e.g., optical units, sound/ultrasound units, etc.), other such sensors or combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 1200 comprises an example of a control and/or processor-based system with the control circuit 1212. Again, the control circuit 1212 can be implemented through one or more processors, controllers, central processing units, logic, software and the like. Further, in some implementations the control circuit 1212 may provide multiprocessor functionality.

The memory 1214, which can be accessed by the control circuit 1212, typically includes one or more processor-readable and/or computer-readable media accessed by at least the control circuit 1212, and can include volatile and/or nonvolatile media, such as RAM, ROM, EEPROM, flash memory and/or other memory technology. Further, the memory 1214 is shown as internal to the control system 1210; however, the memory 1214 can be internal, external or a combination of internal and external memory. Similarly, some or all of the memory 1214 can be internal, external or a combination of internal and external memory of the control circuit 1212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the network 114. The memory 1214 can store code, software, executables, scripts, data, content, lists, programming, programs, log or history data, user information, customer information, product information, and the like. While FIG. 12 illustrates the various components being coupled together via a bus, it is understood that the various components may actually be coupled to the control circuit and/or one or more other components directly.

Figure 13:
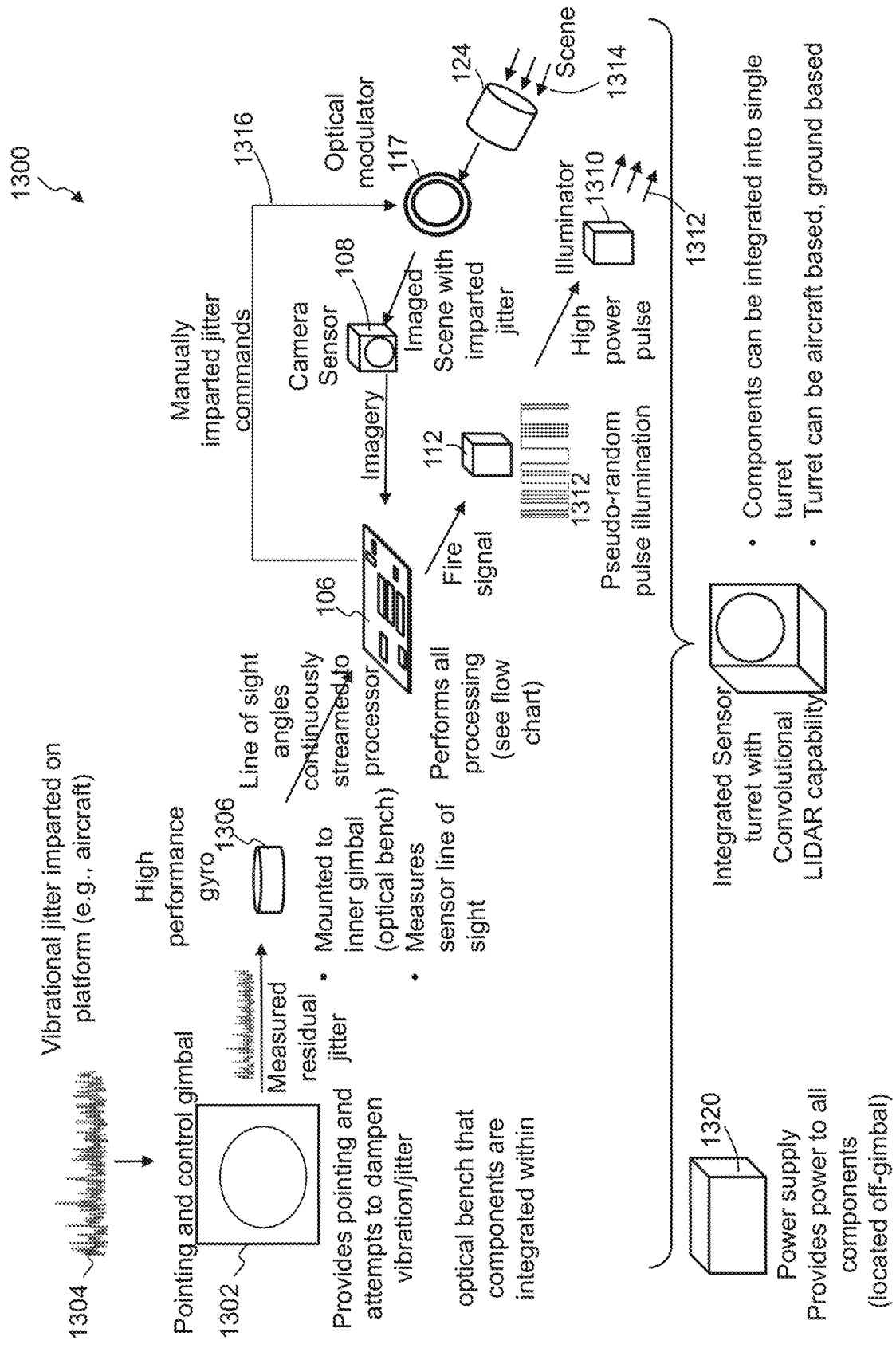
FIG. 13 illustrates a simplified block diagram of a distance measurement system in accordance with some embodiments.

FIG. 13 illustrates a simplified block diagram of a distance measurement system 1300 in accordance with some embodiments. The distance measurement system 1300 includes a point and control gimbal 1302 that is controlled to provide pointing of the system and/or image capture system. In some embodiments, the gimbal 1302 provides dampening of vibration and/or jitter 1304 that may be imparted on the distance measurement system, such as when the distance measurement system is mounted within a vehicle. Additionally, in some applications, the gimbal 1302 includes a bench, frame or other structure with which other components of the distance measurement system 1300 are mounted. One or more sensor systems 1306 are included in some embodiments, such as high performance gyroscope and/or other sensors. One or more of the sensor systems measure residual jitter on the system and/or changes in line of sight of the image capture system 108. The measured changes in line of sight are received at a range measurement circuit 106 and/or processing board. The range measurement circuit 106, in some embodiments, controls one or more illumination source systems 112 (e.g., one or more laser drivers) to emit illumination. In some implementations, the illumination is emitted as high power pulses to an illuminator 1310 to emit as series of controlled, pseudo-random pulses of illumination 1312 that is directed along a line of sight of one or more image capture systems 108.

Light 1314 from the scene is directed through one or more optics 124 (e.g., telescope, etc.) to one or more image capture systems 108. In some embodiments, the distance measurement system 1300 includes one or more jitter induction systems 117 that are controlled to induce an intentional, and known jitter and/or other changes in light of sight. For example, the jitter induction system 117 may include one or more optical modulators, fast steering mirrors and/or other such systems. The range measurement circuit 106 can provide control 1316 to the jitter induction system 117 to provide a desired and/or known amount of change in line of sight. The one or more image capture systems are optically aligned to detect the received illumination and capture images according to one or more frame rates. The images are communicated to the range measurement circuit 106 and/or image processing sub-system of the range measurement circuit. One or more power sources 1320 are included to provide power to one or more of the components of the distance measurement system 1300. In some embodiments, the distance measurement system 1300 provides an integrated sensor system implemented on an integrated sensor turret to provide convolutional LIDAR capabilities.

Some embodiments provide improved distance measuring and/or 3D LIDAR systems that are implemented through substantially simpler electronics than other 3D LIDAR systems. Such other more complex LIDAR systems often employ both complex circuitry supporting each imaging pixels and high-energy pulse lasers. Some embodiments of the present distance measurement systems and methods, however, are implemented utilizing time varying (quasi-continuous wave) laser illumination, standard commercial off-the-shelf imaging systems or cameras with known standard pixel technology, and simple sensors (e.g., gyroscope, accelerometer, other sensors or combination of two or more of such sensors).

In some embodiments, the system utilizes a combination of known time-dependent illumination envelopes and known wander (e.g., measured and/or induced angular changes) relative to an assumed pixel range in calculating candidate blurring PSFs that each correspond to different distances from the distance measurement system. These candidate PSFs are utilized, in some embodiments, to deconvolve (deblur) evaluation images and/or compound reference images. Based on the knowledge that a PSF that does not correspond to an accurate distance leads to artifacts in a deconvolved image (e.g., ringing, etc.), a correct PSF and thus a corresponding distance is identified through one or more evaluation images through an identification of a lowest artifact power of deconvolved images that have been deconvolved by candidate PSFs. In some embodiments, artifact power is estimated by subtracting a deconvolved evaluation image from a reference image. These distance determination techniques, in some embodiments, are enhanced by employing an optical modulator in the optical path or other such system to induce known, and in some instances high-speed, angular wander. Additionally, such techniques identify ranges with discriminating artifacts with relatively high SNR. Some embodiments provide improvements and simplifications of previous LIDAR systems by eliminating the use of complex time-of-flight circuitry and ultra-fast exposure gating read out integrated circuits (ROIC). Instead, some embodiments provide reduced size, weight and power (SWAP) demand systems that provide range finding (e.g., laser), 2D and/or 3D imaging, automated target recognition, self-navigation in denied environments, self-driving vehicles, and other such applications.

Some embodiments enable sensors on a platform to perform multiple modes using the same hardware, thereby reducing the size, weight and power required for multiple capabilities, such as 2D imaging, laser-range-finding, LIDAR, and 3D imaging. In addition to this multi-mode SWAP improvements and savings, some embodiments provide higher 2D resolution imaging and/or higher temporal frame-rates than previous 3D LIDAR systems. For example, the distance measurement system 100, in some embodiments, provides 720p high-definition (HD) resolution imaging techniques, while some previous systems having similar implementations provide at bet about 128×128 pixel resolutions. Accordingly, some embodiments provide novel, and enhanced 2D and 3D imaging that employ conventional 2D active imaging through, in part, multi-mode performance reducing SWAP, and relacing laser range finders while still enabling precision, high definition LIDAR imaging. Some embodiments control one or more illumination source systems 112, in part, to provide controlled modulation of the illumination directed at a scene of interest while taking advantage of range dependent blur caused LOS jitter and/or controlled induced LOS changes. In part, some embodiments utilize capitalize on the effects that deconvolving with a PSF that is inconsistent with a corresponding distance of an object in a scene of interest (e.g., incorrect blur inversion that induces artifacts). Artifact power can be used, in part to identify distances. Some embodiments identify a minimum artifact power resulting for deconvolving at least a region or portion of an evaluation image based on multiple deconvolutions using multiple different PSFs to identify correct range bins based on identified minimization of artifact power.

Some embodiments utilize a reference image and synthetically implants a ROI from the evaluation image (e.g., a multi-range image) into an intentionally blurred version of the reference image. In implementations, the reference image is blurred once for each PSF of a set of PSFs to produce a set of blurred reference images, and implants at least one ROI from the evaluation image into each of the blurred reference images of the set of blurred reference images providing a set of compound reference images. Each compound reference image can be deconvolved according to the PSF and artifacts measured for each range relative to at least the ROI. In some embodiments, the range can be identified that corresponds to a PSF that results in a minimum artifact power. Some embodiments further enhance the evaluation through spatial weighting of pixel range spectrum correlations.

As described above, some embodiments utilize a series of multiple evaluation images to enhance the precision and/or accuracy of the determined distances. The distances determined over multiple evaluation images between the distance measurement system 100 and an object and/or scene of interest can be statistically evaluated to reduce error and/or obtain a higher resolution of the distance measures. A set of ranges from multiple sequential evaluation images or frames, in some implementations, are averaged to compensate for the error in a single frame. Such use of multiple evaluation images often provides higher resolution and improved signal to noise ratio. As one example, a distance measurement system 100 can capture a first reference image (e.g., applying a relatively short evaluation integration duration), capture a first evaluation image (e.g., using a longer evaluation image integration duration) and determine a first set of one or more distances based on the first evaluation image relative to the first reference image, capture a second reference image (e.g., evaluation integration duration), capture a second evaluation image (e.g., evaluation image integration duration) and determine a second set of one or more distances based on the second evaluation image relative to the second reference image, capture a third reference image (e.g., evaluation integration duration), capture a third evaluation image (e.g., evaluation image integration duration) and determine a third set of one or more distances based on the third evaluation image relative to the third reference image, capture a fourth reference image (e.g., evaluation integration duration), capture a fourth evaluation image (e.g., evaluation image integration duration) and determine a fourth set of one or more distances based on the fourth evaluation image relative to the fourth reference image, etc. The sets of determined distances can be statistically processed to determine a final set of one or more enhanced distances.

As described above, in some embodiments the range measurement circuit is further configured to, for each candidate PSF of the set of candidate PSFs, blur the reference image according to one of the candidate PSFs of the set of candidate PSFs and obtain a set of blurred reference images each corresponding to one of the set of candidate PSFs. A blurred reference image ROI, within each blurred reference image of the set of blurred reference images, is replaced with an evaluation image ROI of the evaluation image of interest to obtain a set of compound blurred reference images 812 each comprising the evaluation image ROI of the evaluation image. The range measurement circuit 106 is further configured to deconvolve each of the compound blurred reference images of the set of compound blurred reference images to obtain a set of deconvolved compound reference images. Each deconvolved compound reference image of the set of deconvolved compound reference images are evaluated relative to the original, non-blurred reference image to determine a respective artifact power at least relative to the ROI of interest and corresponding to the one candidate PSF used to deconvolve the compound reference images, which is the same candidate PSF used to blur the reference image. In some embodiments, the artifact power is determined specific to the ROI to reduce processing time and computational resources. Using the set of artifact powers the range measurement circuit 106 is configured to identify a single candidate PSF that produces a deconvolved compound reference image or deconvolved compound reference image ROI, of the set of deconvolved compound reference images, that results in the determined artifact power relative to the reference image that is lower than the corresponding artifact powers determined from the other candidate PSFs of the set of candidate PSFs. The distance corresponding to the identified single candidate PSF is identified for the ROI.

This process can be repeated multiple times using different ROIs to identify different distances associated with the multiple different ROIs. In some embodiments, the repeated evaluation of the multiple different ROIs of the evaluation image enables the distance measurement system 100 to operate as a LIDAR to provide a matrix of different distances corresponding to different portions of the evaluation image and/or objects in the scene of interest and captured in the evaluation image. In some implementations, the range measurement circuit, for each of multiple different ROIs of the evaluation image, replaces a second blurred reference image ROI, within each of the blurred reference images of the set of blurred reference images, with a second ROI of the first evaluation image to obtain a second set of compound blurred reference images. The second ROI is different than a previous ROI evaluated in the reference image, such as shifted a predefined number and/or matrix of pixels (e.g., shifted right by three pixels; shifted right by two pixels and shifted down by two pixels; shifted down by five pixels; other such shift; or a combination of two or more shifts). The amount of shift can be dependent on one or more factors such as but not limited to a size of the ROI, a size and/or number of pixels of the evaluation image, a degree of accuracy attempting to be obtained in distance measurement, duration of time to implement processing, processing capabilities of the one or more range measurement circuits 106 and/or processing circuits implemented in the distance measurement system 100 and/or external to the distance measurement system, a number of PSFs, signal to noise ratio of the evaluation image, other such factors, and typically a combination of two or more of such factors.

Each of the compound blurred reference images of the second set of compound blurred reference images is deconvolved based on the respective candidate PSF used to blur the reference image to obtain a second set of deconvolved compound reference images. Each of the deconvolved compound reference images of the second set of deconvolved compound reference images is evaluated relative to the reference image to identify a second candidate PSF that produces a second deconvolved compound reference image, of the second set of deconvolved compound reference images, that results in a determined second artifact power relative to the reference image that is lower than a corresponding second artifact power determined from the other deconvolved compound reference images of the second set of deconvolved compound reference images. A second distance is determined that corresponds to the second candidate PSF defining a distance between the image capture system 108 and a second object captured within the second ROI of the evaluation image. The second distance may be the same as but is often different than the distance determined for another one of the ROIs of the evaluation image (e.g., the second distance is different than a first distance associated with a first ROI of the evaluation image).

It has been identified that vibrations and other jitter (e.g., caused by a moving platform (e.g., a moving vehicle) in which an imaging system is mounted, weather conditions affecting a stationary or mobile platform with which an imaging system is secured, vibrations from other equipment, etc.) can drastically affect precision of distance measurement systems, LIDAR system, and the resolution and clarity of images captured by imaging systems. Many low mass imaging systems exhibit enhanced platform vibration coupling. Numerous previous motion correction techniques with image capture systems fail to provide adequate correction in part due to limits in predicting semi-chaotic motion with sufficient precision to effectively implement mechanical corrective actions. Further, as integration times of an imaging system increase to capture an image, the angular displacement jitter that the imaging system is subjected to during that integration time increases. In some embodiments, imaging systems mounted in vehicles and other moving platforms that are subject to vibration and/or movement include mechanical stabilization systems (e.g., motors, etc.) that can apply mechanical techniques to attempt to compensate for at least some movement of the imaging system. Such mechanical stabilization systems, however, typically have relatively slow reaction times (e.g., about 100-500 Hz) relative to the frequencies of vibrations and other such jitter, which are often thousands of Hz.

Some embodiments provide 2D and/or 3D LIDAR that utilizes substantially simpler electronics than other conventional 3D LIDAR system, which typically require both complex circuitry supporting each imaging pixel and high-energy pulsed lasers. Alternatively, the imaging technique provided through at least some of the below described systems and methods utilize time varying (e.g., quasi-continuous-wave) illumination (e.g., laser), standard commercial off-the-shelf digital image capture systems with known pixel technology, and information from which can be determined changes in line of sight (LOS) of the image capture systems. Such information may be provided from one or more sensor systems (e.g., one or more gyroscopes, one or more accelerometers, one or more velocity sensors, other such sensors or a combination of two or more of such sensors), and/or information about known, induced changes in the line of sight. A set of candidate blurring point-spread-function (PSF) to be calculated based on the combination of the determined and/or known time-dependent illumination envelope and the determined and/or known change in LOS (e.g., angular wander, which in some instances may be determined from the sensor information). The set of PSFs can then be used to blur (deconvolve) the image, and because incorrect PSFs lead to ringing artifacts in the image, the correct PSF (and therefore range) can be identified by the image with the lowest artifact power, where artifact power is estimated by subtracting either a proxy image such as the previous video frame or a blind-deconvolution image of the original frame. Some embodiments provide introduce an optical modulator in the optical path that leads to a high-speed deterministic angular wander. Accordingly, some embodiments provide an image processing technique that identifies range discriminating artifacts with high SNR.

In some embodiments, systems are provided to determine distances to one or more objects, and comprise an image capture system; an angular movement system configured to report line of sight (LOS) angular displacement changes over time relative to the image capture system; an illumination source configured to emit an illumination pulse toward a scene of interest, the illumination pulse having a time varying amplitude; and a range measurement circuit communicatively coupled with the image capture system, the angular movement system and the illumination source, wherein the range measurement circuit is configured to: obtain, based on at least one of measured and induced LOS angular displacement changes relative to the image capture system, a set of candidate point-spread-functions (PSFs) that each correspond to a different possible object range; deconvolve, using each candidate PSF of the set of candidate PSFs, at least a first region of interest (ROI) in a received first evaluation image obtained by the image capture system during a first integration duration of time to obtain at least a set of deconvolved ROIs of the first evaluation image, each corresponding to a respective one of the set of candidate PSFs; identify a first candidate PSF, of the set of candidate PSFs, that produces a respective deconvolved ROI, of the set of deconvolved ROIs resulting in a determined artifact power that is lower than a corresponding artifact power determined from the other candidate PSFs of the set of candidate PSFs; and determine a first distance corresponding to the first candidate PSF as a distance between the image capture system and a first object at least partially captured within the first ROI of the first evaluation image.

Some embodiments provide methods of determining a distance to one or more objects, comprising: controlling an illumination source to emit an illumination pulse toward a scene of interest, the illumination pulse having a time varying amplitude; controlling an image capture system to capture images; obtaining, based on at least one of measured and induced line of sight (LOS) angular displacement changes relative to the image capture system, a set of candidate point-spread-functions (PSFs) that each correspond to a different possible object range; deconvolving, using each candidate PSF of the set of candidate PSFs, at least a first region of interest (ROI) in a received first evaluation image obtained by the image capture system during a first integration duration of time to obtain at least a set of deconvolved ROIs of the first evaluation image, each corresponding to a respective one of the set of candidate PSFs; identifying a first candidate PSF, of the set of candidate PSFs, that produces a respective deconvolved ROI, of the set of deconvolved ROIs, resulting in a determined artifact power that is lower than a corresponding artifact power determined from the other candidate PSFs of the set of candidate PSFs; and determining a first distance corresponding to the first candidate PSF as a distance between the image capture system and a first object at least partially captured within the first ROI of the first evaluation image.

Still further, some embodiments provide systems that determines distances to one or more objects, the systems comprising: an image capture system; an angular movement system configured to report line of sight (LOS) angular displacement changes over time of the image capture system; an illumination source configured to emit an illumination pulse toward a scene of interest, the illumination pulse having a time varying amplitude; and a range measurement circuit communicatively coupled with the image capture system, the angular movement system and the illumination source, wherein the range measurement circuit is configured to: process, using each of a set of candidate point-spread-functions (PSFs), a portion of an evaluation image captured by the image capture system during a first integration duration of time of the scene of interest having been illuminated, wherein each candidate PSF is dependent on at least one of measured and induced LOS angular displacement changes during the first integration duration of time; determine a distance between the image capture system and an object at least partially captured within the portion of the evaluation image as a distance corresponding a given candidate PSF of the set of candidate PSFs resulting in an artifact power, when processing the evaluation image, that is lower than respective artifact powers determined based the processing of the evaluation image relative to the other candidate PSFs of the set of candidate PSFs.

Some embodiments provide systems that determine distance to one or more objects, the system comprising: an electro-optical image capture system; an angular movement system configured to report line of sight (LOS) angular displacement changes over time of the image capture system; a range measurement circuit communicatively coupled with the angular movement system and the image capture system, wherein the range measurement circuit, is configured to: obtain a first reference image of a first scene of interest obtained based on an image captured by the image capture system; activate the image capture system over a first integration duration of time to capture a first evaluation image; obtain a first set of one or more of the LOS angular changes of the image capture system during at least a portion of the first integration duration; obtain a first set of multiple point-spread-functions (PSF) that are dependent on the first set of one or more LOS angular changes; deconvolve at least a first region of interest (ROI) of the first evaluation image based on each of the first set of PSFs to obtain at least a first set of deconvolved first ROIs of the first evaluation image; identify a first PSF, of the first set of PSFs, that produces the respective deconvolved first ROI of the first evaluation image resulting in a determined artifact power, corresponding to at least the first ROI, having a predefined relationship with a power threshold; and determine a first distance corresponding to the first PSF defining a distance between the image capture system and a first target captured within the first ROI of the first evaluation image.

Further, some embodiments provide methods of determining a distance to one or more objects, comprising: obtaining, at a range measurement circuit, a first reference image of a first scene of interest obtained based on an image captured by an image capture system; activating the image capture system over a first integration duration of time to capture a first evaluation image; obtaining a first set of one or more line of sight (LOS) angular displacement changes of the image capture system during at least a portion of the first integration duration; obtaining a first set of multiple pointspread-functions (PSF) that are dependent on the first set of one or more LOS angular changes; deconvolving at least a first region of interest (ROI) of the first evaluation image based on each of the first set of PSFs to obtain at least a first set of deconvolved first ROIs of the first evaluation image; identifying a first PSF, of the first set of PSFs, that produces a respective deconvolved first ROI of the first evaluation image resulting in a determined artifact power, corresponding to at least the first ROI, having a predefined relationship with a power threshold; and determining a first distance corresponding to the first PSF defining a distance between the image capture system and a first target captured within the first ROI of the first evaluation image.

While the invention herein disclosed has been described by means of specific embodiments, examples and applications thereof, numerous modifications and variations could be made thereto by those skilled in the art without departing from the scope of the invention set forth in the claims.

What is claimed is:

1. A system that determines distance to one or more objects, the system comprising:
    an image capture system;
    an angular movement system configured to report line of sight (LOS) angular displacement changes over time relative to the image capture system;
    an illumination source configured to emit an illumination pulse toward a scene of interest, the illumination pulse having a time varying amplitude; and
    a range measurement circuit communicatively coupled with the image capture system, the angular movement system and the illumination source, wherein the range measurement circuit is configured to:
    obtain, based on at least one of measured and induced LOS angular displacement changes relative to the image capture system, a set of candidate point-spread-functions (PSFs) that each correspond to a different possible object range;
    deconvolve, using each candidate PSF of the set of candidate PSFs, at least a first region of interest (ROI) in a received first evaluation image obtained by the image capture system during a first integration duration of time to obtain at least a set of deconvolved ROIs of the first evaluation image, each corresponding to a respective one of the set of candidate PSFs;
    identify a first candidate PSF, of the set of candidate PSFs, that produces a respective deconvolved ROI, of the set of deconvolved ROIs resulting in a determined artifact power that is lower than a corresponding artifact power determined from the other candidate PSFs of the set of candidate PSFs; and
    determine a first distance corresponding to the first candidate PSF as a distance between the image capture system and a first object at least partially captured within the first ROI of the first evaluation image.

2. The system of claim 1, wherein the range measurement circuit is further configured to:
    obtain a reference image of the scene of interest obtained based on an image captured by the image capture system; and
    wherein the identifying the first candidate PSF comprises identifying the first candidate PSF that produces the respective deconvolved ROI resulting in the determined artifact power relative to the reference image that is lower than the corresponding artifact power determined from the other candidate PSFs of the set of candidate PSFs relative to the reference image.

3. The system of claim 2, wherein the range measurement circuit is further configured to activate the image capture system for a reference image integration duration of time to cause the image capture system to capture the reference image of the scene of interest, wherein the reference image integration duration of time is less than the first integration duration of time.

4. The system of claim 2, wherein the range measurement circuit in deconvolving at least the first ROI of the first evaluation image further deconvolves the first evaluation image, including the first ROI, based on each of the set of candidate PSFs to obtain a first set of deconvolved evaluation images; and
    wherein the range measurement circuit, for each deconvolved evaluation image of the first set of deconvolved evaluation images, evaluates the respective deconvolved evaluation image with respect to the reference image and determines the respective artifact power as a function of the respective deconvolved evaluation image relative to the reference image, and identifies the first candidate PSF that produces a corresponding first deconvolved evaluation image resulting in the determined artifact power, relative to the reference image, that is lower than the respective artifact power determined from the deconvolving of the first evaluation image by each of the other candidate PSFs of the set of candidate PSFs.

5. The system of claim 2, wherein the range measurement circuit is further configured to:
    for each candidate PSF of the set of candidate PSFs, blur the reference image according to one of the candidate PSFs of the set of candidate PSFs and obtain a set of blurred reference images each corresponding to one of the candidate PSFs of the set of candidate PSFs; and
    replace, within each blurred reference image of the set of blurred reference images, a first blurred reference image ROI with the first ROI of the first evaluation image to obtain a set of compound blurred reference images each comprising the first ROI of the first evaluation image; and
    wherein the range measurement circuit, in deconvolving at least the first ROI of the first evaluation image, is configured to deconvolve each of the compound blurred reference images to obtain a set of deconvolved compound reference images; and
    wherein the range measurement circuit, in identifying the first candidate PSF, is configured to identify the first candidate PSF that produces a first deconvolved compound reference image, of the set of deconvolved compound reference images, that results in the determined artifact power relative to the reference image that is lower than the corresponding artifact power determined from the other candidate PSFs of the set of candidate PSFs.

6. The system of claim 5, wherein the range measurement circuit is further configured to:
    for each of multiple different ROIs of the first evaluation image:
    replace, within each of the blurred reference images of the set of blurred reference images, a second blurred reference image ROI with a second ROI of the first evaluation image to obtain a second set of compound blurred reference images, wherein the second ROI is different than the first ROI;
    deconvolve each of the compound blurred reference images of the second set of compound blurred reference images to obtain a second set of deconvolved compound reference images;

evaluate each of the deconvolved compound reference images of the second set of deconvolved compound reference images relative to the reference image and identify a second candidate PSF that produces a second deconvolved compound reference image, of the second set of deconvolved compound reference images, that results in a determined second artifact power relative to the reference image that is lower than a corresponding second artifact power determined from the other deconvolved compound reference images of the second set of deconvolved compound reference images; and determine a second distance corresponding to the second candidate PSF defining a distance between the image capture system and a second object at least partially captured within the second ROI of the first evaluation image, wherein the second distance is different than the first distance.

7. The system of claim 1, wherein the range measurement circuit, in obtaining the set of candidate PSFs, is configured to weight aspects of each of the candidate PSFs relative to the other candidate PSFs of the set of candidate PSFs, and apply the weightings to highlight differences when performing the deconvolving of the first ROI by each of the candidate PSFs.

8. The system of claim 7, wherein the range measurement circuit in weighting the aspects of each of the candidate PSFs is configured to:
convert each of the candidate PSFs of the set of candidate PSFs into frequency domain to obtain a set of candidate frequency domain PSFs; and
statistically evaluate the frequency domain PSFs and identify regions of frequency domain where the candidate PSFs differ the most and are used in emphasizing differences in resulting deconvolved images using each of the candidate PSFs.

9. The system of claim 1, wherein the angular movement system comprises a jitter sensor system communicatively coupled with the range measurement circuit, wherein the jitter sensor system is configured to detect over time a series of LOS angular displacement measures of the image capture system and communicate the series of LOS angular displacement measures to the range measurement circuit; and
wherein the range measurement circuit is configured to identify, from the series of LOS angular displacement measures, the LOS angular displacement changes during at least the portion of the first integration duration.

10. The system of claim 1, wherein the angular movement system comprises a jitter induction system that generates a series of induced LOS angular displacement changes occurring at a known rate and known angular displacement; and
wherein the range measurement circuit is configured to identify, from the series of induced LOS angular displacement changes, the LOS angular displacement changes during at least the portion of the first integration duration.

11. A method of determining a distance to one or more objects, comprising:
controlling an illumination source to emit an illumination pulse toward a scene of interest, the illumination pulse having a time varying amplitude;
controlling an image capture system to capture images;
obtaining, based on at least one of measured and induced line of sight (LOS) angular displacement changes relative to the image capture system, a set of candidate point-spread-functions (PSFs) that each correspond to a different possible object range;
deconvolving, using each candidate PSF of the set of candidate PSFs, at least a first region of interest (ROI) in a received first evaluation image obtained by the image capture system during a first integration duration of time to obtain at least a set of deconvolved ROIs of the first evaluation image, each corresponding to a respective one of the set of candidate PSFs;
identifying a first candidate PSF, of the set of candidate PSFs, that produces a respective deconvolved ROI, of the set of deconvolved ROIs, resulting in a determined artifact power that is lower than a corresponding artifact power determined from the other candidate PSFs of the set of candidate PSFs; and
determining a first distance corresponding to the first candidate PSF as a distance between the image capture system and a first object at least partially captured within the first ROI of the first evaluation image.

12. The method of claim 11, further comprising:
obtaining a reference image of the scene of interest obtained based on an image captured by the image capture system; and
wherein the identifying the first candidate PSF comprises identifying the first candidate PSF that produces the respective deconvolved ROI resulting in the determined artifact power relative to the reference image that is lower than a corresponding artifact power determined from the other candidate PSF of the set of candidate PSFs relative to the reference image.

13. The method of claim 12, further comprising:
activating the image capture system for a reference image integration duration of time causing the image capture system to capture the reference image of the scene of interest, wherein the reference image integration duration of time is less than the first integration duration of time.

14. The method of claim 12, wherein the deconvolving at least the first ROI of the first evaluation image comprises deconvolving the first evaluation image, including the first ROI, based on each of the set of candidate PSFs to obtain a first set of deconvolved evaluation images; and
for each deconvolved evaluation image of the first set of deconvolved evaluation images:
evaluating the respective deconvolved evaluation image with respect to the reference image and determining the respective artifact power as a function of the respective deconvolved evaluation image relative to the reference image; and
identifying the first candidate PSF that produces a corresponding deconvolved evaluation image resulting in the determined artifact power, relative to the first reference image, that is lower than the respective artifact power determined from the deconvolving of the first evaluation image by each of the other candidate PSFs of the set of candidate PSFs.

15. The method of claim 12, further comprising:
for each candidate PSF of the set of candidate PSFs:
blurring the reference image according to one of the candidate PSFS of the set of candidate PSFs and obtaining a set of blurred reference images each corresponding to one of the candidate PSFs of the set of candidate PSFs; and
replacing, within each blurred reference image of the set of blurred reference images, a first blurred reference image ROI with the first ROI of the first evaluation image to obtain a set of compound blurred reference images each comprising the first ROI of the first evaluation image;

wherein the deconvolving at least the first ROI of the first evaluation image comprises deconvolving each of the compound blurred reference images to obtain a set of deconvolved compound reference images; and wherein the identifying the first candidate PSF comprises identifying the first candidate PSF that produces a first deconvolved compound reference image, of the set of deconvolved compound reference images, that results in the determined artifact power relative to the reference image that is lower than the corresponding artifact power determined from the other candidate PSF of the set of candidate PSFs.

16. The method of claim 15, further comprising:

for each of multiple different ROIs of the first evaluation image:

replacing, within each of the blurred reference images of the set of blurred reference images, a second blurred reference image ROI with a second ROI of the first evaluation image to obtain a second set of compound blurred reference images, wherein the second ROI is different than the first ROI;

deconvolving each of the compound blurred reference images of the second set of compound blurred reference images to obtain a second set of deconvolved compound reference images;

evaluating each of the deconvolved compound reference images of the second set of deconvolved compound reference images relative to the reference image and identifying a second candidate PSF that produces a second deconvolved compound reference image, of the second set of deconvolved compound reference images, that results in a determined second artifact power relative to the reference image that is lower than a corresponding second artifact power determined from the other deconvolved compound reference images of the second set of deconvolved compound reference images; and determining a second distance corresponding to the second candidate PSF defining a distance between the image capture system and a second object at least partially captured within the second ROI of the first evaluation image, wherein the second distance is different than the first distance.

17. The method of claim 11, wherein the obtaining the set of candidate PSFs comprises:

weighting aspects of each of candidate PSF relative to the other candidate PSFs of the set of candidate PSFs; and applying the weightings to highlight differences when performing the deconvolving of the first ROI by each of the candidate PSFs of the set of candidate PSFs.

18. The method of claim 17, wherein the weighting the aspects of each of the candidate PSFs comprises converting each of the candidate PSFs of the set of candidate test PSFs into frequency domain to obtain a set of candidate frequency domain PSFs; and statistically evaluating the frequency domain PSFs and identifying regions of frequency domain where the candidate PSFs differ the most and are used in emphasizing differences in resulting deconvolved images using each of the candidate PSFs.

19. The method of claim 11, further comprising:

receiving, over time from a jitter sensor system, a series of LOS angular displacement measures of the image capture system; and identifying, from the series of LOS angular displacement measures, the LOS angular displacement changes during at least the portion of the first integration duration.

20. The method of claim 11, further comprising:

generating, through a jitter induction system, a series of induced LOS angular displacement changes occurring at a known rate and known angular displacement; and identifying, from the series of known LOS angular displacement changes, the LOS angular displacement changes during at least the portion of the first integration duration.

21. A system that determines distance to one or more objects, the system comprising:

an image capture system;

an angular movement system configured to report line of sight (LOS) angular displacement changes over time of the image capture system;

an illumination source configured to emit an illumination pulse toward a scene of interest, the illumination pulse having a time varying amplitude; and a range measurement circuit communicatively coupled with the image capture system, the angular movement system and the illumination source, wherein the range measurement circuit is configured to:

process, using each of a set of candidate point-spread-functions (PSFs), a portion of an evaluation image captured by the image capture system during a first integration duration of time of the scene of interest having been illuminated, wherein each candidate PSF is dependent on at least one of measured and induced LOS angular displacement changes during the first integration duration of time;

determine a distance between the image capture system and an object at least partially captured within the portion of the evaluation image as a distance corresponding a given candidate PSF of the set of candidate PSFs resulting in an artifact power, when processing the evaluation image, that is lower than respective artifact powers determined based the processing of the evaluation image relative to the other candidate PSFs of the set of candidate PSFs.

* * * * *